US008046020B2

(12) United States Patent
Lee et al.

(10) Patent No.: US 8,046,020 B2
(45) Date of Patent: Oct. 25, 2011

(54) CONTROL METHOD AND DEVICE OF UPLINK ACCESS TRANSMISSION POWER IN RADIO COMMUNICATIONS SYSTEM

(75) Inventors: Jinsock Lee, Tokyo (JP); Kojiro Hamabe, Tokyo (JP)

(73) Assignee: NEC Corporation, Tokyo (JP)

(*) Notice: Subject to any disclaimer, the term of this patent is extended or adjusted under 35 U.S.C. 154(b) by 593 days.

(21) Appl. No.: 12/107,947

(22) Filed: Apr. 23, 2008

(65) Prior Publication Data

US 2008/0268893 A1 Oct. 30, 2008

(30) Foreign Application Priority Data

Apr. 27, 2007 (JP) ................................. 2007-120298

(51) Int. Cl.
*H04Q 7/20* (2006.01)

(52) U.S. Cl. .... 455/522; 455/69; 455/127.1; 455/67.11; 455/500; 455/517; 370/241; 370/310; 370/328; 370/329

(58) Field of Classification Search .................. 455/522, 455/69, 127.1, 500, 517, 67.11, 436–444, 455/423–425, 426.1, 426.2, 504, 502, 507, 455/508, 512, 65; 370/241, 310, 328, 329
See application file for complete search history.

(56) References Cited

U.S. PATENT DOCUMENTS 6,374,117 B1 * 4/2002 Denkert et al. ............... 455/522
7,853,281 B2 * 12/2010 Das et al. ...................... 455/522
2006/0068790 A1 * 3/2006 Sawamoto et al. ........... 455/441

FOREIGN PATENT DOCUMENTS

| GB | 2 445 336 A | 7/2008 |
|---|---|---|
| WO | WO-01/78423 A1 | 10/2001 |
| WO | WO-2005/034382 A1 | 4/2005 |
| WO | WO-2007/052783 A1 | 5/2007 |
| WO | WO-2007/120338 A2 | 10/2007 |

OTHER PUBLICATIONS

3GPP TS36.300 V1.0.0 (Mar. 2007); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

* cited by examiner

*Primary Examiner* — Keith T Ferguson
(74) *Attorney, Agent, or Firm* — Dickstein Shapiro LLP

(57) ABSTRACT

A control method and device for uplink access transmission power are provided that can control inter-cell interference in a radio communications system. In a radio communications system including a plurality of radio communication devices which control a plurality of cells respectively, each radio communication device detects an uplink access delay in its own cell, compares the uplink access delay with a target delay, and, based on the result of this comparison, controls a value related to uplink access transmission power.

31 Claims, 15 Drawing Sheets

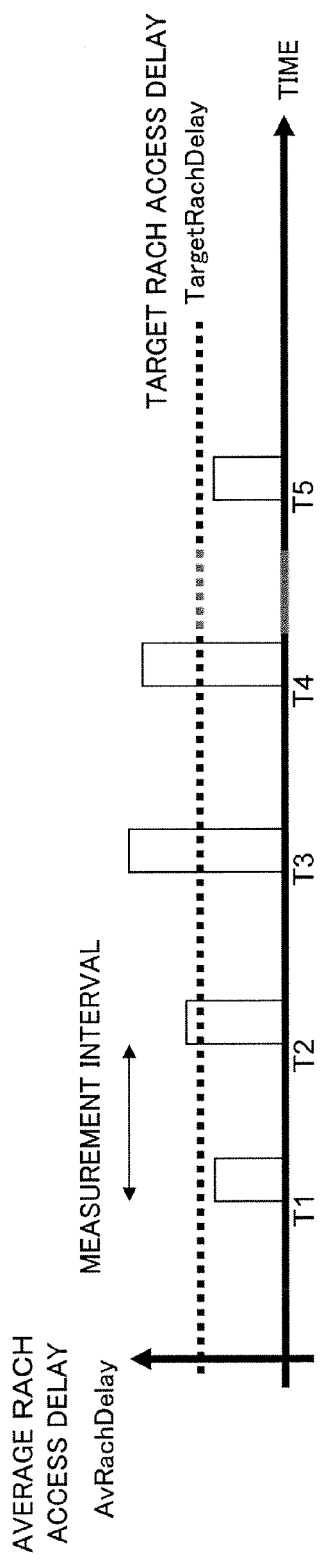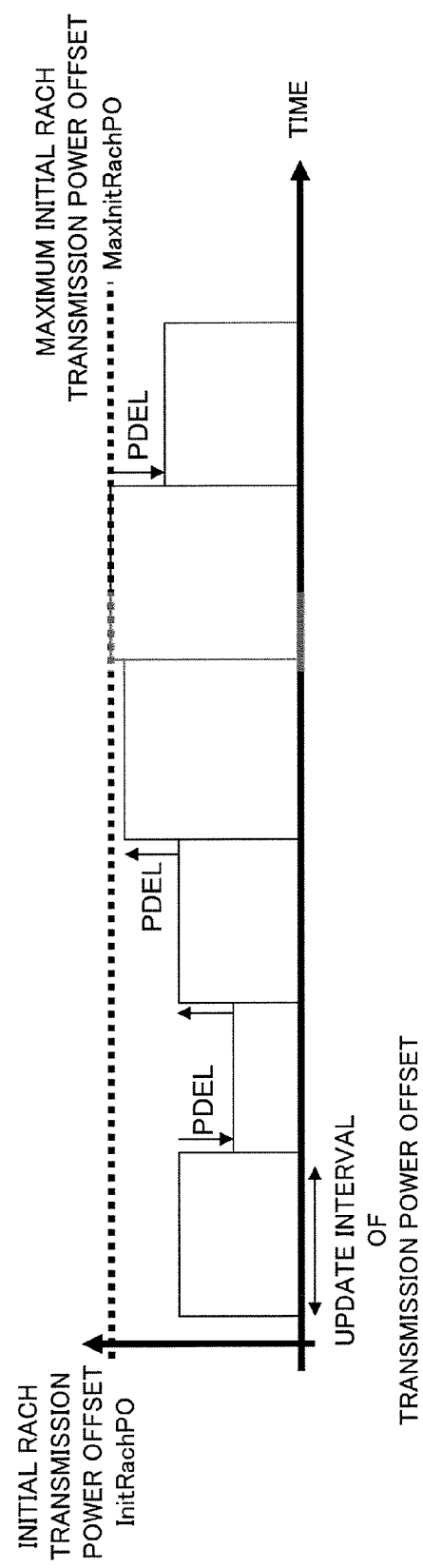

MODIFIED EXAMPLE OF
SECOND EXEMPLARY EMBODIMENT

CONTROL METHOD AND DEVICE OF UPLINK ACCESS TRANSMISSION POWER IN RADIO COMMUNICATIONS SYSTEM

BACKGROUND OF THE INVENTION

1. Field of the Invention

This application is based upon and claims the benefit of priority from Japanese Patent Application No. 2007-120298, filed on Apr. 27, 2007, the disclosure of which is incorporated herein in its entirety by reference.

The present invention relates to a radio communications system having a plurality of radio zones (hereinafter, referred to as cells) and, more particularly, to a method and a device for controlling the transmission power of an uplink access control signal.

2. Description of the Related Art

In a mobile communications system, for a base station and a mobile station to perform data communication, they need to establish synchronization between them in advance. Since initial access from the mobile station in particular is not always in synchronization, the base station requires some procedure for uplink synchronization with the mobile station.

According to Long Term Evolution (LTE), which is being standardized by the 3rd generation partnership project (3GPP), a random access channel (RACH) and an uplink shared channel (UL-SCH) are provided for uplink synchronization and uplink data transmission. The RACH is a channel to transmit a control signal for the establishment of uplink synchronization and further to request a resource for the transmission of uplink data. To establish uplink synchronization without a long delay, it is preferable that the probability of RACH transmission collision be reduced as low as possible (see 3GPP TS 36.300 V.1.0.0, Mar. 19, 2007). On the other hand, the UL-SCH is a channel to transmit data and Layer-2/Layer-3 control packets.

FIG. 1A is a diagram schematically showing a generic structure of a mobile communications system according to LTE, and FIG. 1B is a resource structure diagram schematically showing radio resources based on both frequency-division and time-division techniques.

In wideband code division multiple access (WCDMA), a RACH and an enhanced dedicated channel (EDCH) share the same frequency resource, multiplexed by using different spreading and scrambling codes. On the other hand, in LTE, a plurality of frequency-divided and time-divided resources are shared by a RACH and an UL-SCH exclusively of each other. Specifically, the LTE uplink has a resource structure in which a system bandwidth of 10 MHz is time-divided into time intervals of 1 msec, each of which is further frequency-divided into widths of 1.25 MHz. Referring to FIG. 1B, each of t1, t2, . . . on the horizontal axis corresponds to a 1-msec-long time resource, and each of FB#1, FB#2, . . . on the vertical axis corresponds to a 1.25-MHz-wide frequency resource. Hereinafter, one rectangular block defined by one time resource and one frequency resource as shown in FIG. 1B will be simply referred to as "resource."

It is each base station eNB that determines how to allocate such system resources to the RACH and UL-SCH. In general, a RACH resource is periodically allocated as shown in FIG. 1B so that a mobile station UE can gain access to the base station without a long delay. It is also possible to allocate a plurality of RACH resources at a time and thereby secure a sufficient RACH access capacity. Each base station eNB generally broadcasts information indicative of which resources) is allocated to the RACH Therefore, every mobile station UE (User Equipment) in a cell can gain access to the RACH resource(s) whenever the mobile station UE needs, in accordance with the broadcast information.

In LTE, some were of the opinion that there was no need to control RACH transmission power, because it had been decided at the beginning that the same frequency band was not shared between the RACH and UL-SCH. In the case where the RACH and UL-SCH are frequency-divided, even if a mobile station UE performs RACH transmission at maximum transmission power, no interference occurs with the UL-SCH transmission of another mobile station UE. Accordingly, there is no significant reason to control RACH transmission power at least within a single cell, from the viewpoint of the occurrence of interference.

However, in the case where a plurality of resources are shared by the RACH and UL-SCH exclusively of each other as shown in FIG. 1B, and where resource allocation is determined in each cell, there is a possibility that the same resource that is allocated for RACH transmission in one of neighboring cells may be allocated for UL-SCH transmission or RACH transmission in the other cell. Accordingly, when a mobile station UE is performing RACH transmission to its serving cell at maximum transmission power, the possibility cannot be ignored that this RACH transmission will interfere with UL-SCH transmission or RACH transmission performed in a neighboring cell. To prevent such inter-cell interference, it is preferable to control RACH transmission power by using some method.

For one of the methods for reducing inter-cell interference as much as possible, power ramping control has been proposed (see 3GPP TS 36.300 V.1.0.0, Mar. 19, 2007). Hereinafter, RACH transmission power control through power ramping will be described briefly.

FIG. 2A is a sequence diagram showing a procedure of uplink access through a RACH, and FIG. 2B is a schematic time chart showing an example of the power ramping performed before synchronization is established through a RACH. For example, when a mobile station UE desires to transmit data, the mobile station UE first receives a broadcast channel (BCH) broadcast by a base station eNB, thereby acquiring an initial coefficient K and RACH resource information. The mobile station UE then calculates initial RACH transmission power $P_{init}$ by using a path loss $P_{LOSS}$, which is measured from a pilot signal (reference signal), and the initial coefficient K (for example, $P_{init}=K \times P_{LOSS}$). Thus, the initial RACH transmission power $P_{init}$ is set so that the reception quality of a RACH signal received by the base station eNB will be kept at a desired level. The mobile station UE performs RACH transmission using a RACH resource at this initial transmission power $P_{init}$. Upon arrival of this RACH transmission at the base station eNB, the base station eNB sends a RACH response including a value for timing adjustment back to the mobile station UE, whereby the mobile station UE can establish physical-layer synchronization. After the establishment of synchronization, the mobile station UE sends a scheduling request to the base station eNB. The base station eNB allocates UL-SCH resources in response to this request and sends back a transmission grant. Thus, the mobile station UE transmits data packets by using the allocated UL-SCH resources.

However, when a RACH signal does not arrive at the base station eNB due to an increase in the level of interference or due to the occurrence of fading, the mobile station UE receives no RACH response even after a predetermined period of time has passed. Therefore, the mobile station UE increases its RACH transmission power by a predetermined step $P_{del}$ at each time as shown in FIG. 2B until the mobile station UE receives a RACH response. Such increasing in RACH transmission power step by step is called "power ramping". A period during which the RACH transmission power is increased step by step, starting from the first RACH transmission, is called "power ramping period," and this power ramping period plus an elapsed time before physical-layer synchronization is established upon receipt of the RACH response is called "RACH access delay." Accordingly, when a RACH transmission collision occurs, the RACH access delay increases.

Moreover, the sum of the RACH access delay and an elapsed time between the establishment of physical-layer synchronization and the establishment of connection upon receipt of the transmission grant is called "LTE call setup delay." The LTE call setup delay also serves as a key performance indicator (KPI), an object of evaluation, of system performance.

By RACH transmission power control through the power ramping, the RACH transmission power of the mobile station UE can be set at such a level that sufficient RACH reception quality is secured at the base station eNB while interference to a neighboring cell is suppressed. For example, in the case of a mobile station UE having a low path loss, since power ramping can be started from a lower power level than the initial RACH transmission power $P_{init}$, the mobile station UE can establish synchronization by RACH transmission at lower transmission power than a mobile station UE having a high path loss. Accordingly, uplink interference to a neighboring cell can be effectively prevented.

However, according to the above-described power ramping control, once RACH interference occurs between neighboring cells, a phenomenon called "party effect," which will be described below, may be caused, in which the initial RACH transmission power increases in all cells one after another.

FIG. 3A is a diagram schematically showing how neighboring cells interfere with each other, FIG. 3B is a graph showing the RACH access delay varying with the level of RACH interference, and FIG. 3C is a graph showing the RACH access delay varying with the load of RACH access. Moreover, FIG. 4 is a time chart showing variation in the average RACH access delay and variation in the RACH transmission power offsets to describe the party effect between neighboring cells.

Generally, a base station tries to make the RACH access delay as short as possible because failing in gaining RACH access causes a delay in a call setup or handover procedure. The RACH access delay can be reduced by increasing the initial RACH transmission power as described above. Here, referring to FIG. 3A, it is assumed that the initial RACH transmission power $P_{init}$ has been increased in a cell A. This increase in initial RACH transmission power in the cell A causes an increase in RACH interference with a neighboring cell B. When the RACH interference is increased, a base station eNB2 controlling the cell B allows the initial RACH transmission power $P_{init}$ to be increased in the cell B in order to shorten the RACH access delay. This increase in initial RACH transmission power in the cell B causes an increase in interference with the neighboring cell A and another neighboring cell C. In each of the cells A and C, since the RACH interference is increased, the initial RACH transmission power is further increased. In this manner, a phenomenon called "party effect" is caused, in which the cause and effect repeat between neighboring cells, whereby the initial RACH transmission power is increased more and more. Accordingly, once interference occurs, the initial RACH transmission power is reciprocally increased between neighboring cells, which causes a chain reaction, resulting in the initial RACH transmission power $P_{init}$ being ultimately set at a maximum value in every cell.

Referring to FIGS. 3B and 3C, in general, as the level of RACH interference becomes higher, or as the frequency of RACH access becomes higher (the load becomes larger), the RACH access delay becomes longer. The level of RACH interference can be measured, for example, as the number of failed RACH transmissions (that is, the number of RACH transmissions made before a RACH response shown in FIG. 2B is received), which is reported to a base station from a mobile station present in the cell of the base station. Therefore, the RACH access delay is measured by using this number, and statistical processing is further performed, whereby the average RACH access delay can be obtained. Moreover, the frequency of RACH access (the load of RACH access) can be measured as the number of times a base station receives RACH access from mobile stations present in the cell of the base station. Therefore, this number is similarly subjected to statistical processing, whereby the average RACH access delay can be obtained.

When the thus-measured RACH access delay increases, each base station eNB raises a RACH transmission power offset as shown in FIG. 4 so that the initial RACH transmission power will be increased step by step. This operation causes the above-described "party effect," resulting in the initial RACH transmission power being set at a maximum value in every cell in the end. This is a cause for degradation of the uplink capacity in the entire network.

Such a problem concerns not only the LTE, but may exist in cell-based general radio communications systems using an access scheme (FTDMA) based on a frequency-divided and time-divided resource structure. Particularly in a system in which resource allocation control is individually performed by base stations or radio communication devices controlling respective cells, there is no provision of a mechanism of automatically controlling RACH transmission power in the entire network. Therefore, inter-cell interference cannot be controlled, leading to the easy occurrence of the above-described "party effect."

SUMMARY OF THE INVENTION

An object of the present invention is to solve the above-described problem and to provide an uplink access transmission power control method and device that can control inter-cell interference.

According to the present invention, a control method of uplink access transmission power in each of a plurality of radio communication devices each controlling cells in a radio communications system, includes: detecting an uplink access delay in a cell of the radio communication device; comparing amount of access delay obtained from the uplink access delay with a target delay; and controlling a value related to uplink access transmission power based on the comparison result.

As described above, according to the present invention, inter-cell interference can be controlled by using a target delay in such a manner that a radio communication device controls a value related to the uplink access transmission power in its own cell, based on the result of comparison between the amount of access delay obtained and the target delay in its own cell. Thus, uplink access transmission power control can be automatically performed in a radio communications system.

BRIEF DESCRIPTION OF THE DRAWINGS

FIG. 5A is a schematic time chart showing an example of the average RACH access delay varying with time in a transmission power control method according to a first exemplary embodiment of the present invention.

FIG. 5B is a schematic time chart showing the initial RACH transmission power offset varying with time, controlled based on the average RACH access delay in the transmission power control method according to the first exemplary embodiment of the present invention.

DETAILED DESCRIPTION OF THE PREFERRED EMBODIMENTS

1. Outline of Exemplary Embodiments

Hereinafter, description will be given of control for increasing/decreasing the RACH transmission power offset. However, the same applies to control for increasing/decreasing the RACH transmission power itself or the size of an increment/decrement step.

1.1) First Exemplary Embodiment

FIGS. 5A and 5B show schematic time charts for describing the outline of a transmission power control method according to a first exemplary embodiment of the present invention. FIG. 5A shows an example of the average RACH access delay varying with time. FIG. 5B shows the initial RACH transmission power offset varying with time, which is controlled based on the average RACH access delay.

A target RACH access delay (TargetRachDelay), a default initial RACH power P0, and a maximum initial RACH transmission power offset (MaxInitRachP0) are preset on each of radio communication devices respectively controlling cells within a network. These parameters, which are set depending on each cell, may be set by a control station (such as an operation and management server of the network, or a radio resource control server) controlling each radio communication device, or may be set when each radio communication device is installed. For example, the target RACH access delay (TargetRachDelay) may be common among the cells in the network, or may be set for each cell individually. In addition, in a small cell, the default initial RACH power P0 and/or the maximum RACH transmission power offset may be set at small values.

Figure 2A:
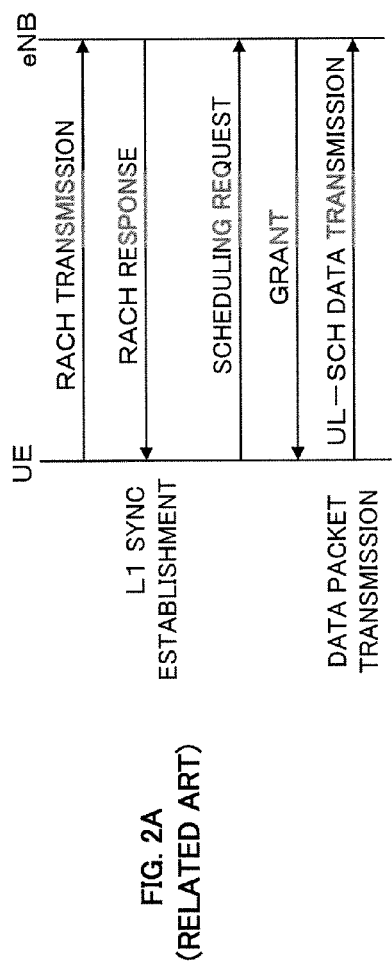
FIG. 2A is a sequence diagram showing a procedure of uplink access through a RACH.
Figure 2B:
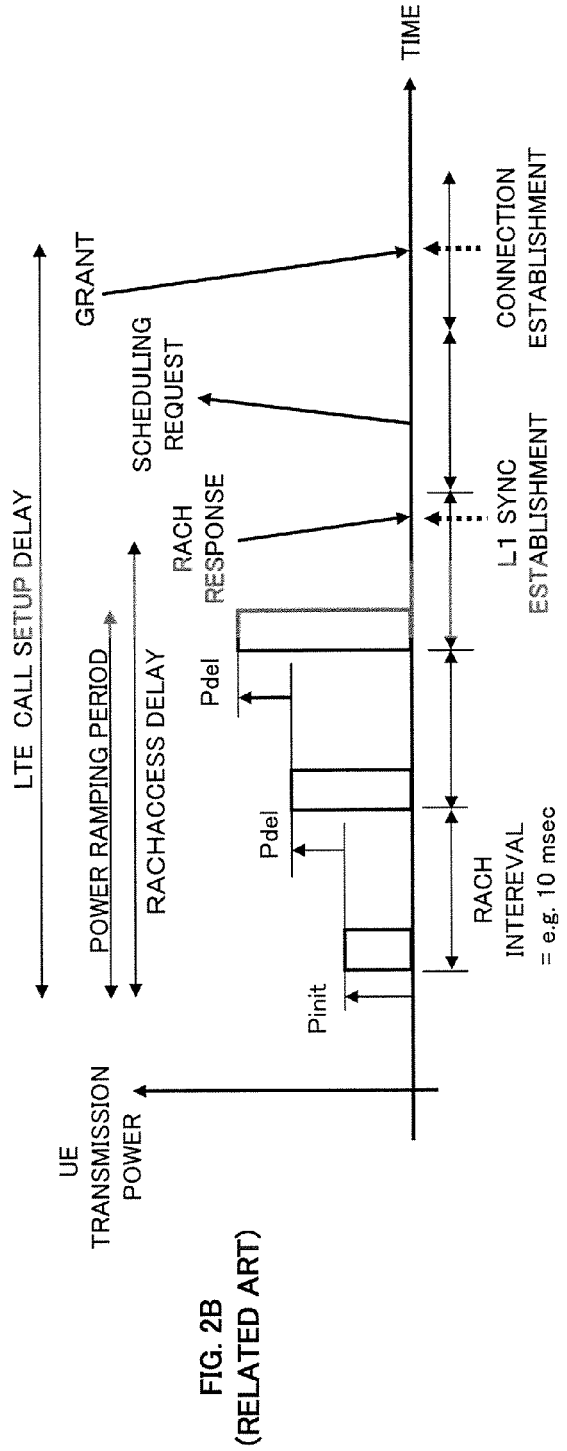
FIG. 2B is a schematic time chart showing an example of power ramping performed before synchronization is established through a RACH.

An average RACH access delay (AvRachDelay) is measured by each radio communication device at constant time intervals. As mentioned earlier, a radio communication device can measure, as the level of RACH interference, for example, the number of failed RACH transmissions (the number of RACH transmissions made before a RACH response shown in FIG. 2 is received), which is reported from a mobile station present in its own cell. Therefore, the radio communication device can obtain the average RACH access delay by statistically processing the numbers of failed RACH transmissions reported from a plurality of mobile stations present within its own cell. In this event, there is no need for all mobile stations UE to always report the number of failed RACH transmissions, but preferably, as many mobile stations make as many reports as enable the radio communication device to calculate a significant average RACH access delay in its own cell. It is sufficient that the reported information can be used to calculate the average RACH access delay. In place of the number of failed RACH transmissions, it is also possible to use time information such as the RACH access delay or the power ramping period shown in FIG. 2B.

Moreover, this reported information can be included in, for example, a scheduling request to be sent from a mobile station and thereby reported to the radio communication device. Alternatively, the reported information can also be transmitted to the radio communication device by padding an allocated resource with it when the allocated resource is larger than requested by a scheduling request, or when the allocated resource is larger than transmission data.

It is also possible that the reported information is generated not by a mobile station UE but on the radio communication device side or on the base station side. For example, a radio communication device can measure, as the frequency of RACH access (the load of RACH access), the number of times a base station eNB has completely received RACH transmission from (the number of times RACH access is gained by) a mobile station UE present in its own cell. Therefore, the radio communication device can obtain the average RACH access delay by statistically processing this number similarly. This method has the advantage that the radio communication device can obtain the average RACH access delay by itself, without reports from mobile stations UE.

Referring to FIG. 5A, each radio communication device measures the average RACH access delay (AvRachDelay) at constant time intervals. Each time a radio communication device measures the average RACH access delay (AvRachDelay), the radio communication device compares it with the target RACH access delay (TargetRachDelay). In this example, the average RACH access delay at time T1 is smaller than the target RACH access delay, but becomes larger at time T2, and becomes further larger at time T3. According to the present exemplary embodiment, based on the result of this comparison, control for increasing/decreasing the initial RACH transmission power offset (InitRachP0) is performed with an upper limit placed at the maximum initial RACH transmission power offset (MaxInitRachP0) so that the average RACH access delay will be pursuant to the target RACH access delay. Accordingly, initial RACH power $P_{init}$ is the value of the default initial RACH power P0 plus the initial RACH transmission power offset (InitRachP0). Here, the default initial RACH power P0 can be obtained, for example, based on the reception quality of a downlink pilot signal.

Referring to FIG. 5B, when it is determined that the average RACH access delay is smaller than the target RACH access delay at time T1, the radio communication device decreases the initial RACH transmission power offset of its own cell by a predetermined step PDEL from the current value. The fact that the initial RACH transmission power offset becomes smaller increases the possibility that the RACH access delay of a mobile station UE attempting to gain access to this cell becomes larger between time T1 and time T2. Thus, if it is determined that the average RACH access delay is larger than the target RACH access delay at time T2, the initial RACH transmission power offset is increased by the predetermined step PDEL from the current value. Despite the fact that the initial RACH transmission power offset has been increased, if the average RACH access delay is still larger than the target RACH access delay at time T3 due to strong inter-cell interference, the radio communication device further increases the initial RACH transmission power offset by the predetermined step PDEL.

Assuming that little effect is brought about even after the initial RACH transmission power offset was increased at time T3, it is determined that the average RACH access delay is still larger than the target RACH access delay also at time T4. However, since the initial RACH transmission power offset has been increased nearly to the maximum initial RACH transmission power offset, the radio communication device can increase the initial RACH transmission power offset only to the same level as the maximum initial RACH transmission power offset. That is, the initial RACH power cannot be set higher than this level.

At time T5, if the inter-cell interference reduces and the average RACH access delay becomes smaller than the target TACH access delay, the radio communication device decreases the initial RACH transmission power offset by the predetermined step PDEL from the current value (here, the maximum initial RACH transmission power offset). Since the fact that the initial RACH transmission power offset is decreased leads to a reduction in RACH interference with a neighboring cell, a radio communication device controlling the neighboring cell can also decrease the initial RACH transmission power offset of the neighboring cell. Note that a lower limit may be placed on the decreased initial RACH transmission power offset.

In addition, when the average RACH access delay (AvRachDelay) is equal to the target RACH access delay (TargetRachDelay), setting can be made such that the initial RACH transmission power offset is increased or decreased depending on which one of interference prevention and connection higher priority is placed on in this cell. For example, in the case where the radio communication device controlling this cell places higher priority on interference prevention, the initial RACH transmission power offset is decreased. In the case where higher priority is placed on connection, the initial RACH transmission power offset is increased. Alternatively, it is also possible that the initial RACH transmission power offset is not changed when the average RACH access delay (AvRachDelay) is equal to the target RACH access delay (TargetRachDelay).

As described above, an upper limit is placed on the initial RACH transmission power offset, whereby the initial RACH transmission power offset of each cell does not become larger than the maximum initial RACH transmission power offset set in each cell. Thus, the party effect described earlier can be effectively prevented.

As mentioned above, although the maximum initial RACH transmission power offset can be set in each cell, this reference can be set depending on which one of interference prevention and connection higher priority is placed on in each cell. For example, in the case where a radio communication device controlling a cell places higher priority on interference prevention, it is sufficient that the maximum initial RACH transmission power offset is set at a relatively small value. In the case where higher priority is placed on connection, it is sufficient that the maximum initial RACH transmission power offset is set at a relatively large value.

Incidentally, the intervals at which the average RACH access delay is measured are not necessarily coincident with the intervals at which the initial RACH transmission power offset is updated. Moreover, as regards the increment/decrement step PDEL by which the initial RACH transmission power offset (InitRachP0) is increased/decreased, the same step size is not necessarily used for an increment step and for a decrement step, but different step sizes may be used.

Specifically, a change can be made between the size of an increment step and the size of a decrement step, depending on the difference between the initial RACH transmission power offset and the maximum initial RACH transmission power offset. For example, at time T1 and time T2, since the difference between the initial RACH transmission power offset and the maximum initial RACH transmission power offset is large, the increment step and the decrement step both can be made large. At time T3, since the initial RACH transmission power offset is at a level close to the maximum initial RACH transmission power offset, the size of an increment step can be made small. At time T5, since the initial RACH transmission power offset is at the same level as the maximum initial RACH transmission power offset, the size of a decrement step can be made large.

Furthermore, the increment/decrement step PDEL can be varied depending on the difference between the average RACH access delay and the target RACH access delay. For example, since the difference between the average value and the target value is smaller at time T2 than at time T3, the size of the increment step at time T2 can be made smaller than that at time T3. In any case, according to the present exemplary embodiment, the initial RACH transmission power offset cannot exceed the maximum initial RACH transmission power offset.

Incidentally, in place of the average RACH access delay, it is also possible to adopt another criterion such as a value containing a predetermined proportion of the RACH access delay (for example, a 95% RACH access delay value which contains 95% of the RACH access delay).

1.2) Second Exemplary Embodiment

Figure 6A:
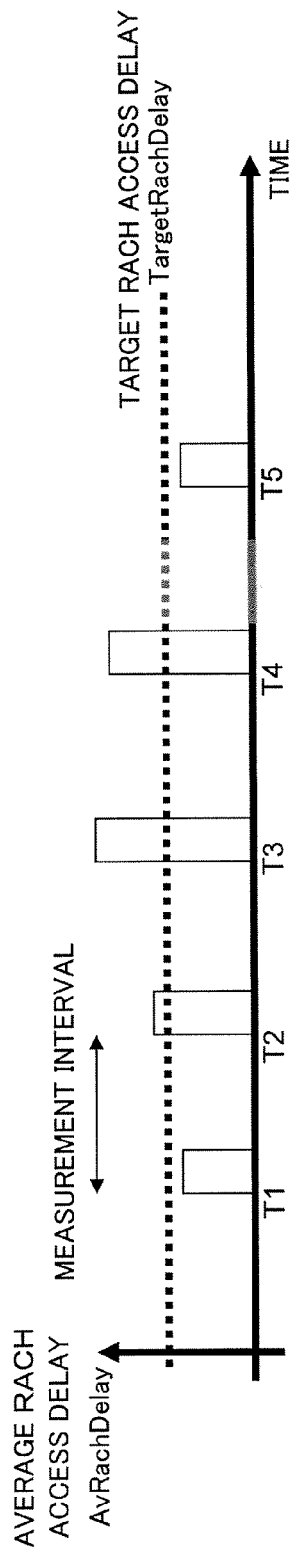
FIG. 6A is a schematic time chart showing an example of the average RACH access delay varying with time in a transmission power control method according to a second exemplary embodiment of the present invention.
Figure 6B:
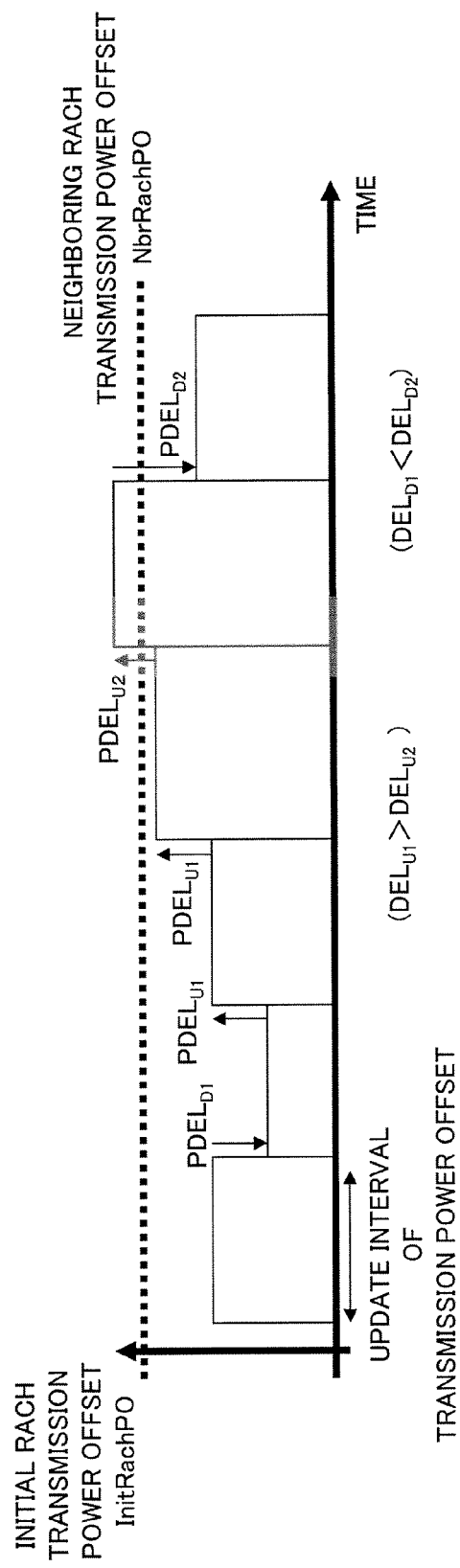
FIG. 6B is a schematic time chart showing the initial RACH transmission power offset varying with time, controlled based on the average RACH access delay in the transmission power control method according to the second exemplary embodiment of the present invention.

FIGS. 6A and 6B shows schematic time charts for describing the outline of a transmission power control method according to a second exemplary embodiment of the present invention. FIG. 6A is a time chart showing an example of the average RACH access delay varying with time, and FIG. 6B is a time chart showing the initial RACH transmission power offset varying with time which is controlled based on the average RACH access delay. Note that the target RACH access delay (TargetRachDelay) and the average RACH access delay (AvRachDelay) shown in FIG. 6A are similar to those described in the first exemplary embodiment, and therefore description thereof will be omitted.

According to the second exemplary embodiment, when a radio communication device sets or updates the initial RACH transmission power in its own cell, the radio communication device notifies a new initial RACH transmission power offset to a radio communication device controlling a neighboring cell. On the other hand, when a radio communication device has received a notification of the initial RACH transmission power offset of a neighboring cell (hereinafter, referred to as "neighboring RACH transmission power offset (NbrRachP0)"), the radio communication device, if increasing the initial RACH transmission power offset of its own cell, sets an increment step of a large size when the initial RACH transmission power offset of its own cell is sufficiently smaller than the neighboring RACH transmission power offset (NbrRachP0). The radio communication device sets an increment step of a small size when the initial RACH transmission power offset of its own cell has been increased to a level close to the neighboring RACH transmission power offset (NbrRachP0) or has exceeded the neighboring RACH transmission power offset (NbrRachP0). As shown in FIGS. 3B and 3C, the RACH access delay does not change greatly when the level of RACH interference or the load of RACH access is small. As the level of RACH interference or the load of RACH access becomes larger, the rate of increase in the RACH access delay becomes greater. Accordingly, it is preferable to change the size of an increment step by which the initial RACH transmission power offset is increased, depending on whether the average RACH access delay is large or small.

As described above, a radio communication device performs less-active control of the RACH transmission power offset when the initial RACH transmission power offset of its own cell almost exceeds or has exceeded the neighboring RACH transmission power offset (NbrRachP0), whereby an increment step of a smaller size is set as the transmission power offset is increased. Thus, it is possible to prevent the scenario of the RACH transmission power offsets of all cells being rapidly increased. Hereinafter, this will be described more specifically.

Referring to FIGS. 6A and 6B, when it is determined that the average RACH access delay is smaller than the target RACH access delay at time T1, the radio communication device decreases the initial RACH transmission power offset of its own cell by a predetermined step $PDEL_{D1}$ from the current value. The fact that the initial RACH transmission power offset becomes smaller increases the possibility that the RACH access delay of a mobile station attempting to gain access to this cell becomes larger between time T1 and time T2. Thus, it is assumed to be determined that the average RACH access delay is larger than the target RACH access delay at time T2. In this case, the radio communication device increases the initial RACH transmission power offset by a predetermined step $PDEL_{U1}$ from the current value if the initial RACH transmission power offset of its own cell is smaller than the neighboring RACH transmission power offset (NbrRachP0). Despite the fact that the initial RACH transmission power offset has been increased, if the average RACH access delay is still larger than the target RACH access delay at time T3 due to strong inter-cell interference or the like and the initial RACH transmission power offset of its own cell is smaller than the neighboring RACH transmission power offset, then the radio communication device further increases the initial RACH transmission power offset by the predetermined step $PDEL_{U1}$.

Assuming that little effect is brought about even after the initial RACH transmission power offset was increased at time T3, it is determined that the average RACH access delay is still larger than the target RACH access delay also at time T4. However, since the initial RACH transmission power offset has been increased nearly to the neighboring RACH transmission power offset, the radio communication device increases the initial RACH transmission power offset by a step $PDEL_{U2}$ the size of which is smaller than that of the predetermined step $PDEL_{U1}$. According to the second exemplary embodiment, it is allowable that the initial RACH transmission power offset of its own cell exceeds the neighboring RACH transmission power offset because of this increase.

At time T5, if the inter-cell interference reduces and the average RACH access delay becomes smaller than the target RACH access delay, the radio communication device decreases the initial RACH transmission power offset by a predetermined step $PDEL_{D2}$ from the current value if the initial RACH transmission power offset of its own cell is greater than the neighboring RACH transmission power offset. Preferably, the decrement step $PDEL_{D2}$ used at this time has a larger size than the predetermined step $PDEL_{D1}$ used at time T1.

As described above, when the initial RACH transmission power offset of its own cell almost exceeds the neighboring RACH transmission power offset (NbrRachP0), the radio communication device reduces the size of an increment step, from the step $PDEL_{U1}$ to the step $PDEL_{U2}$, whereby it is possible to avoid the scenario of the RACH transmission power offsets of all cells being rapidly increased. Thus, the party effect can be effectively prevented.

Moreover, when the initial RACH transmission power offset is decreased from a nigh level like a level exceeding the neighboring RACH transmission power offset (NbrRachP0), the size of a decrement step is increased from the step $PDEL_{D1}$ to the step $PDEL_{D2}$, whereby the RACH transmission power offset of the neighboring cell is also resultantly decreased, with the result that the level of interference can be promptly reduced. Note that an upper limit and a lower limit may be placed on the increased initial RACH transmission power offset and the decreased initial RACH transmission power offset, respectively.

1.3) Third Exemplary Embodiment

Figure 7A:
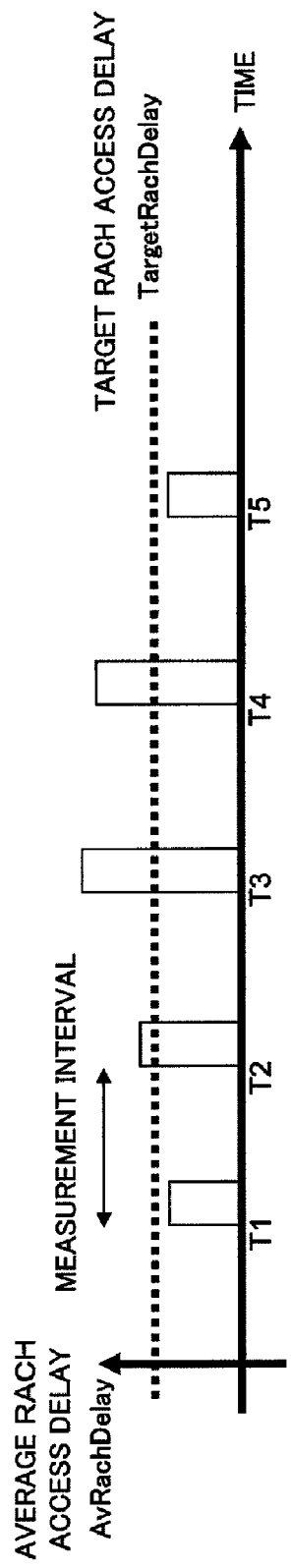
FIG. 7A is a schematic time chart showing an example of the average RACH access delay varying with time in a transmission power control method according to a third exemplary embodiment of the present invention.
Figure 7B:
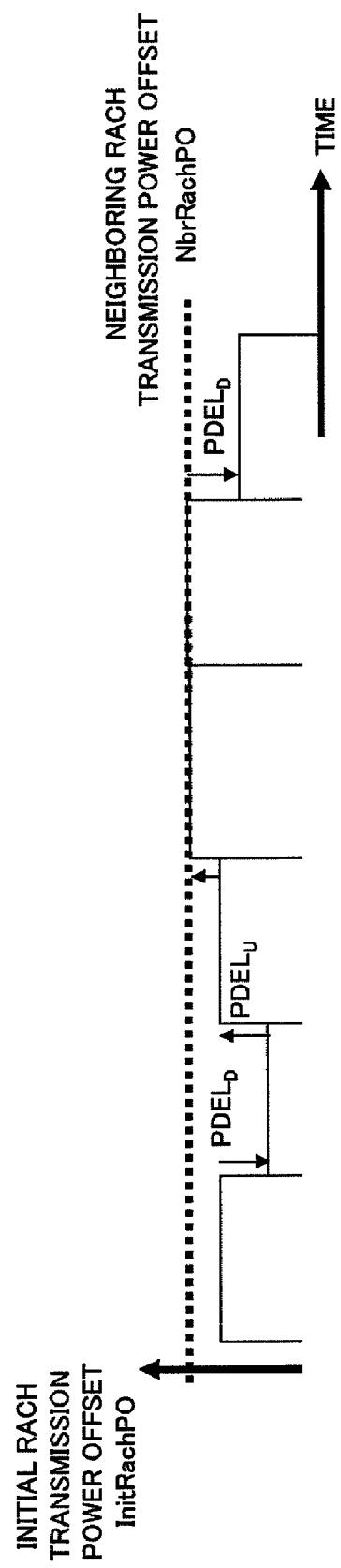
FIG. 7B is a schematic time chart showing the initial RACH transmission power offset varying with time, controlled based on the average RACH access delay in the transmission power control method according to the third exemplary embodiment of the present invention.

FIGS. 7A and 7B shows schematic time charts for describing the outline of a transmission power control method according to a third exemplary embodiment of the present invention. FIG. 7A is a time chart showing an example of the average RACH access delay varying with time, and FIG. 7B is a time chart showing the initial RACH transmission power offset varying with time which is controlled based on the average RACH access delay. Note that the target RACH access delay (TargetRachDelay) and the average RACH access delay (AvRachDelay) shown in FIG. 7A are similar to those described in the first exemplary embodiment, and therefore description thereof will be omitted.

According to the third exemplary embodiment, when a radio communication device sets or updates the initial RACH transmission power in its own cell, the radio communication device notifies a new initial RACH transmission power offset to a radio communication device controlling a neighboring cell. On the other hand, when a radio communication device has received a notification of the initial RACH transmission power offset of a neighboring cell (hereinafter, referred to as "neighboring RACH transmission power offset (NbrRachP0)"), the radio communication device places an upper limit on the initial RACH transmission power offset by using the neighboring RACH transmission power offset (NbrRachP0) in place of the maximum initial RACH transmission power offset used in the first exemplary embodiment. Accordingly, the basic operation of the third exemplary embodiment is similar to that of the first exemplary embodiment. The initial RACH transmission power offset of each cell does not become larger than the RACH transmission power offset (NbrRachP0) of its neighboring cell, and thus the party effect can be effectively prevented.

Note that, as shown in FIG. 7B, an increment step $PDEL_U$ and a decrement step $PDEL_D$ by which the initial RACH transmission power offset (InitRachP0) is increased or decreased may have the same size, or may have different sizes.

Specifically, the increment step $PDEL_U$ and the decrement step $PDEL_D$ can be varied depending on the difference between the initial RACH transmission power offset and the neighboring RACH transmission power offset (NbrRachP0). For example, at time T2, since the difference between the initial RACH transmission power offset and the neighboring RACH Transmission power offset (NbrRach0) is large, the size of the increment step $PDEL_U$ can be made large. At time T3, since the initial RACH transmission power offset is at a level close to the neighboring RACH transmission power offset (NbrRachP0), the size of the increment step $PDEL_U$ can be made small. At time T5, since the initial RACH transmission power offset is at the same level as the neighboring RACH transmission power offset (NbrRachP0), the size of the decrement step $PDEL_D$ can be made large.

Moreover, the increment step $PDEL_U$ and the decrement step $PDEL_D$ can also be varied depending on the difference between the average RACH access delay and the target RACH access delay. For example, since the difference between the average value and the target value at time T2 is smaller than that at time T3, the size of the increment step at time T2 is made smaller than that at time T3. In any case, according to the third exemplary embodiment, the initial RACH transmission power offset cannot exceed the neighboring RACH power offset (NbrRachP0).

1.4) Modified Example

Figure 8:
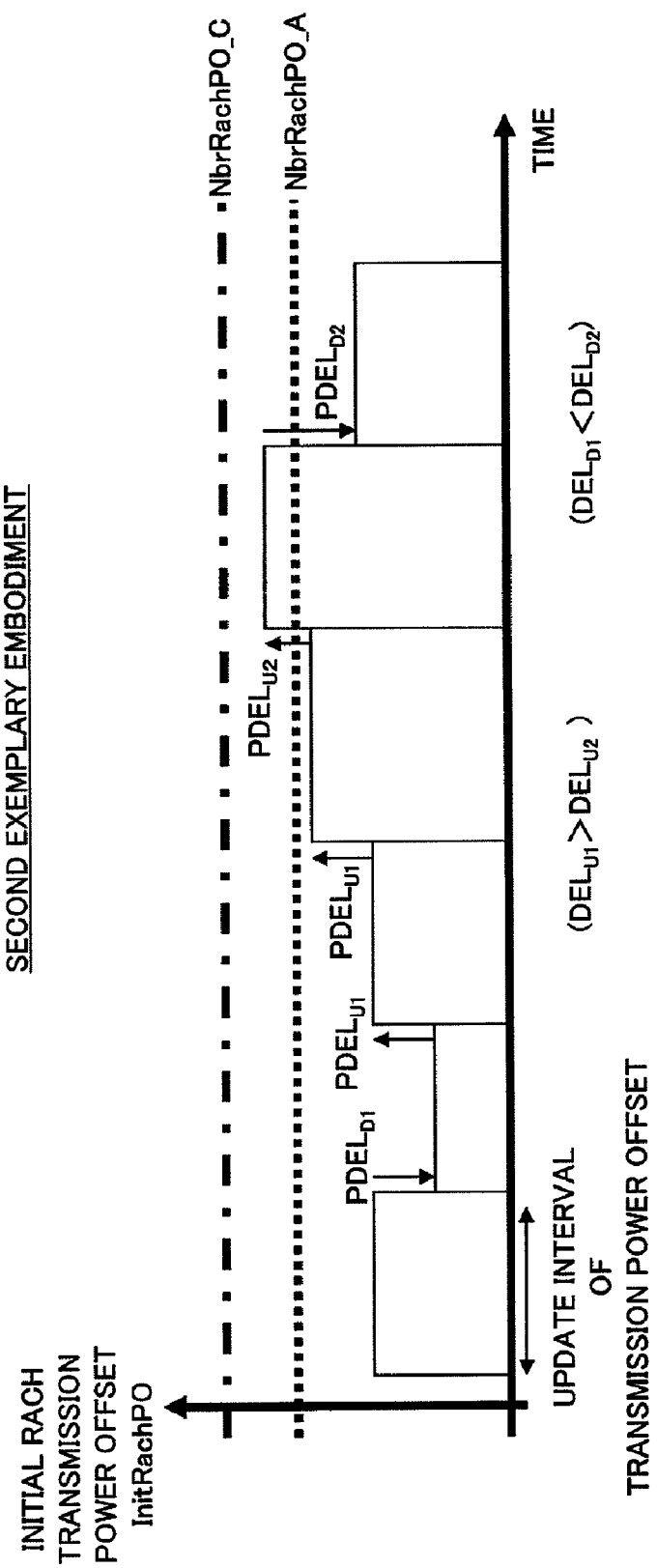
FIG. 8 is a time chart showing the initial RACH transmission power offset varying with time, controlled based on the average RACH access delay, in a transmission power control method according to a modification example of the second exemplary embodiment of the present invention.

FIG. 8 is a time chart showing the initial RACH transmission power offset varying with time which is controlled based on the average RACH access delay, in a transmission power control method according to a modification example of the second exemplary embodiment of the present invention. Note that the target RACH access delay (TargetRachDelay) and the average RANCH access delay (AvKachDelay) are similar to those shown in FIG. 6A in the second exemplary embodiment, and therefore illustration thereof is omitted in FIG. 8.

Figure 3A:
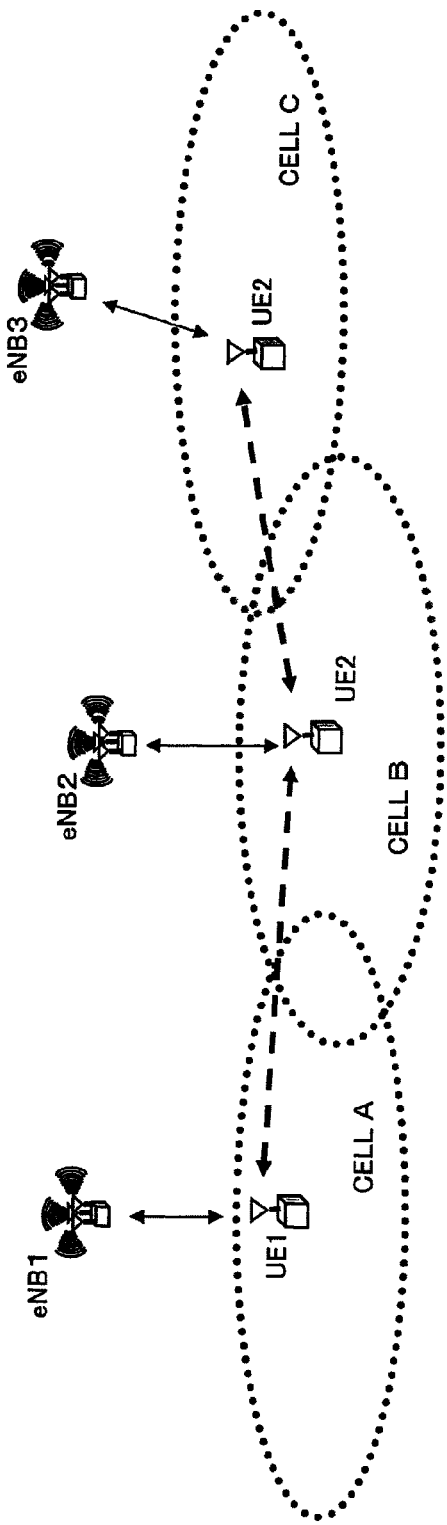
FIG. 3A is a diagram schematically showing how neighboring cells interfere with each other.
Figure 3C:
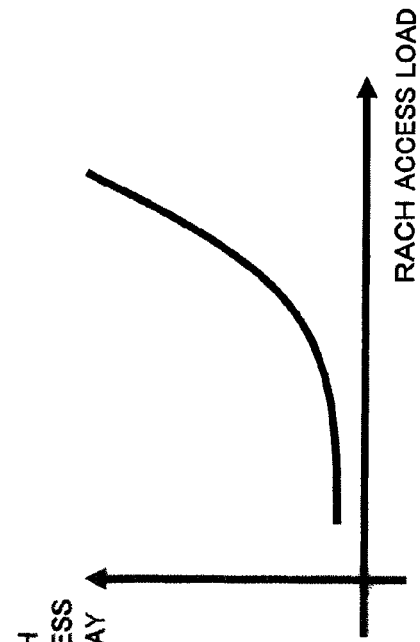
FIG. 3C is a graph showing the RACH access delay varying with the load of RACH access.
Figure 3B:
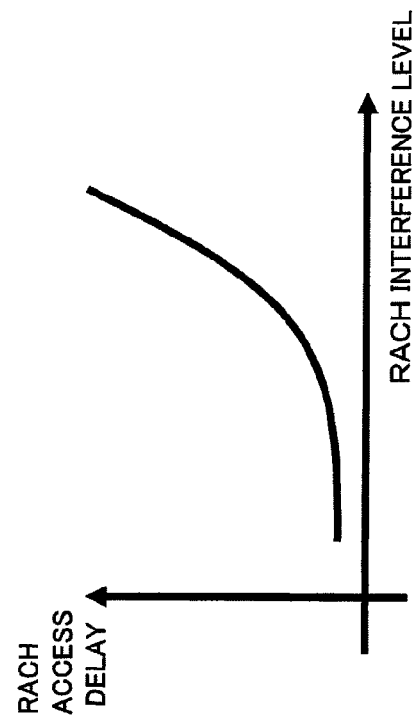
FIG. 3B is a graph showing the RACH access delay varying with the level of RACH interference.
Figure 4:
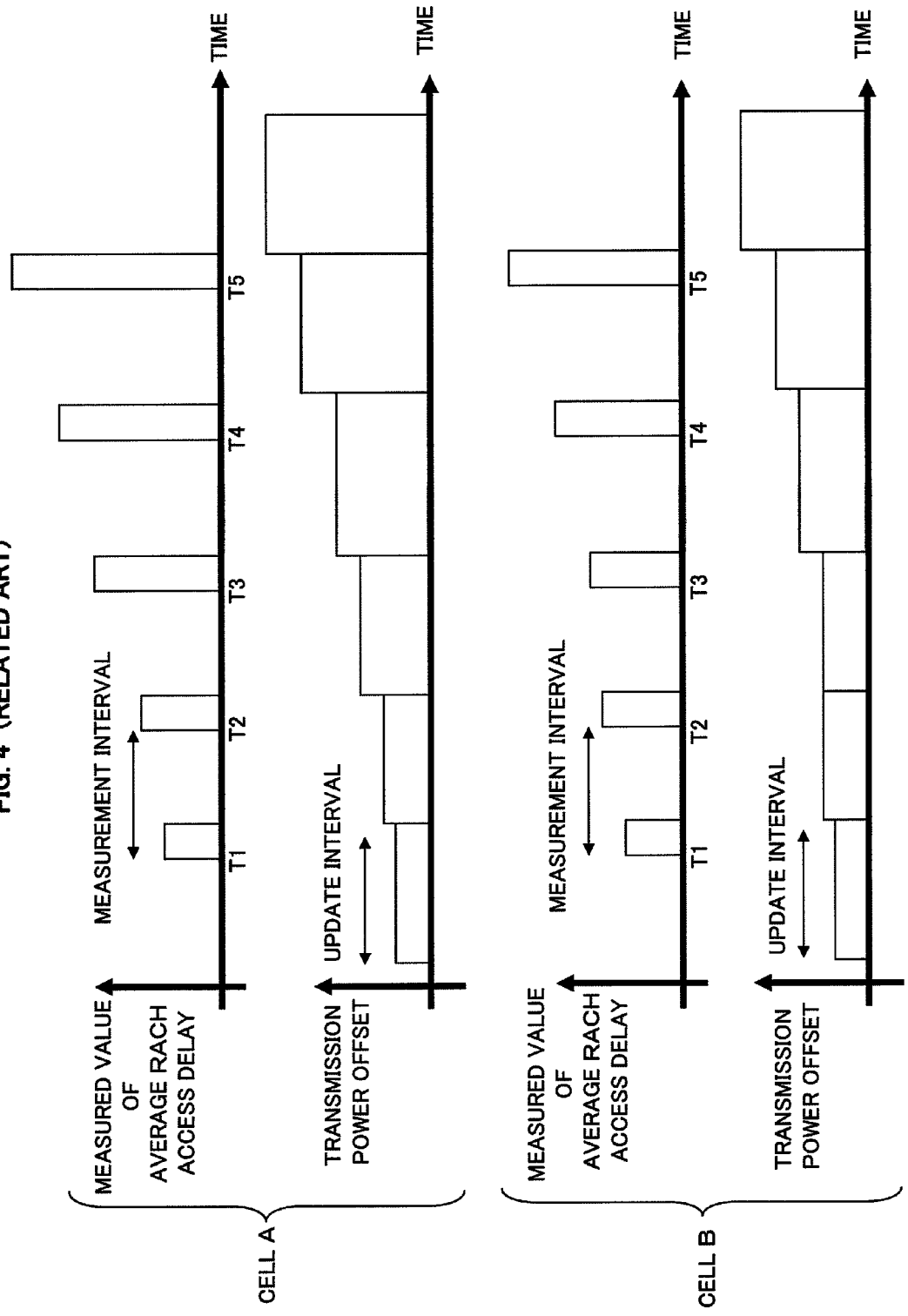
FIG. 4 is a time chart showing variation in the average RACH access delay and variation in the RACH transmission power offset, to describe the party effect between neighboring cells.

For example, in the case where a cell B has neighboring cells A and C as shown in FIG. 3A, a radio communication device controlling the cell B receives neighboring RACH transmission power offsets (NbrRachP0_A, NbrRachP0_C) from the neighboring cells A and C respectively. In this case, it is sufficient that the radio communication device selects any one of the received neighboring RACH transmission power offsets as a reference. Which to select can be determined depending on which one of interference prevention and connection higher priority is placed on. For example, if the radio communication device controlling the cell B places higher priority on interference prevention, the radio communication device may select a smaller one (here, NbrRachP0_A) of the neighboring RACH transmission power offsets as a reference. If the radio communication device controlling the cell B places higher priority on connection, the radio communication device may select a larger one (here, NbrRachP0_C) of the neighboring RACH transmission power offsets as a reference. Alternatively, as a medium reference between the priority on interference prevention and the priority on connection, the average value of the plurality of neighboring RACH transmission power offsets can also be used.

Note that the modification example shown in FIG. 8 can also apply to neighboring RACH transmission power offsets in the third exemplary embodiment.

Moreover, when a plurality of neighboring cells exist, a radio communication device does not necessarily need to always refer to the neighboring RACH transmission power offsets (NbrRachP0) of all the neighboring cells. For example, in the case where a RACH resource used in the cell B is different from a RACH resource used in the cell C, it is not required to control the RACH transmission power between the cells B and C. Accordingly, in the second and third exemplary embodiments, it is preferable that RACH resource information be exchanged between neighboring cells and, when the RACH resources used in the neighboring cells match or are close to each other, the above-described RACH transmission power control be performed.

2. System Structure

Figure 9:
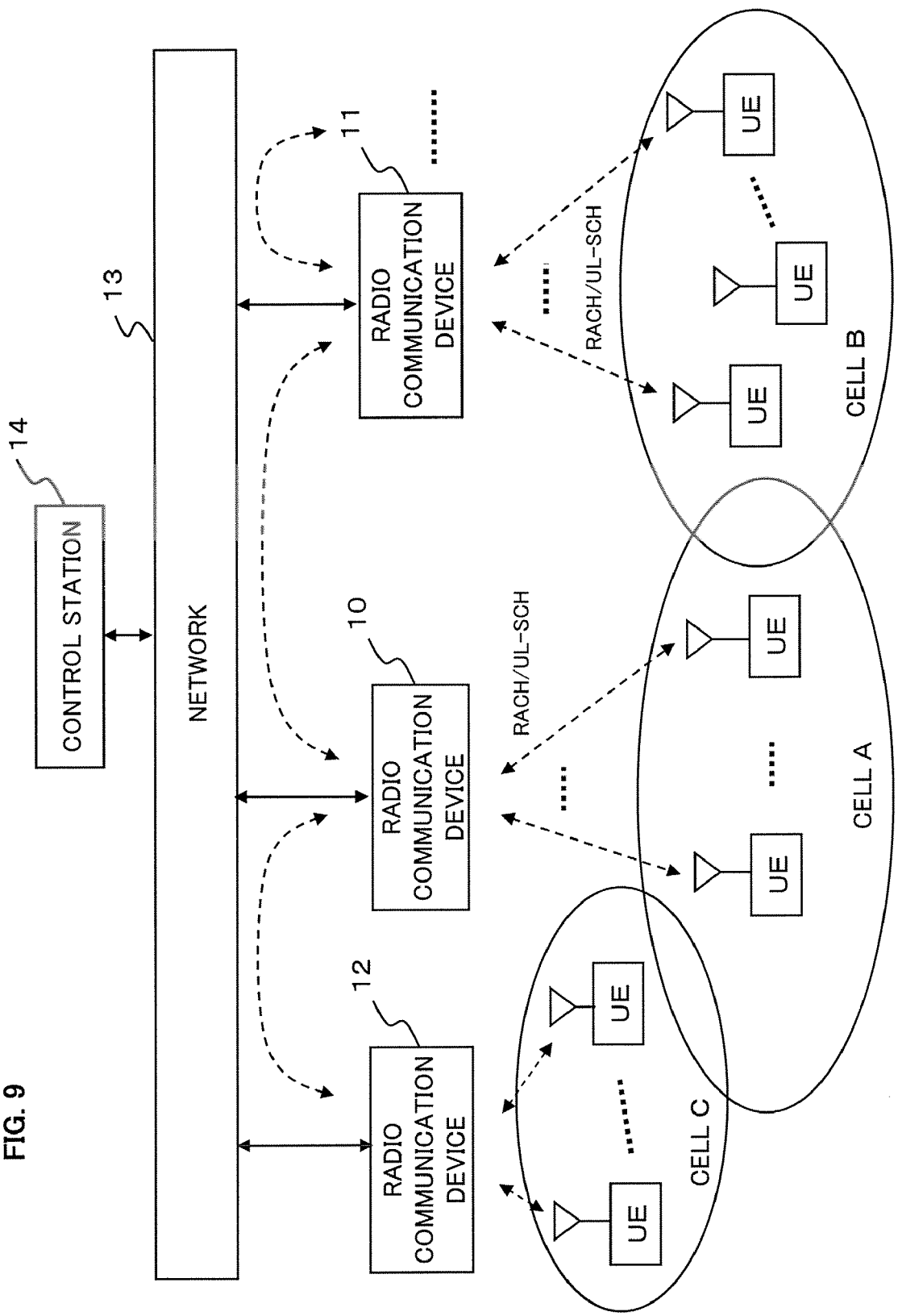
FIG. 9 is a block diagram showing a schematic structure of a radio communications system including radio communication devices implementing the present invention.

FIG. 9 is a block diagram showing an example of the schematic structure of a radio communications system including radio communication devices implementing the present invention. Here, it is assumed that a plurality of radio communication devices including radio communication devices 10 to 12 are communicably connected to each other through a network 13, and that each of the radio communication devices is controlled by a control station 14 through the network 13. Examples of the control station 14 include a central station controlling the network 13, an O&M server performing network operation and maintenance, a PRM server performing radio resource management, and the like.

Figure 1A:
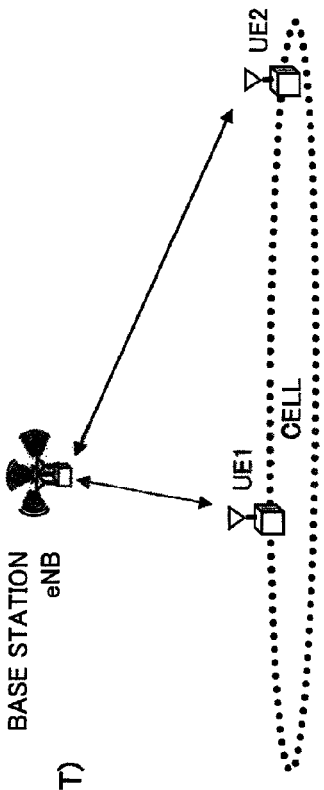
FIG. 1A is a diagram schematically showing a generic structure of a mobile communications system according to the LTE.
Figure 1B:
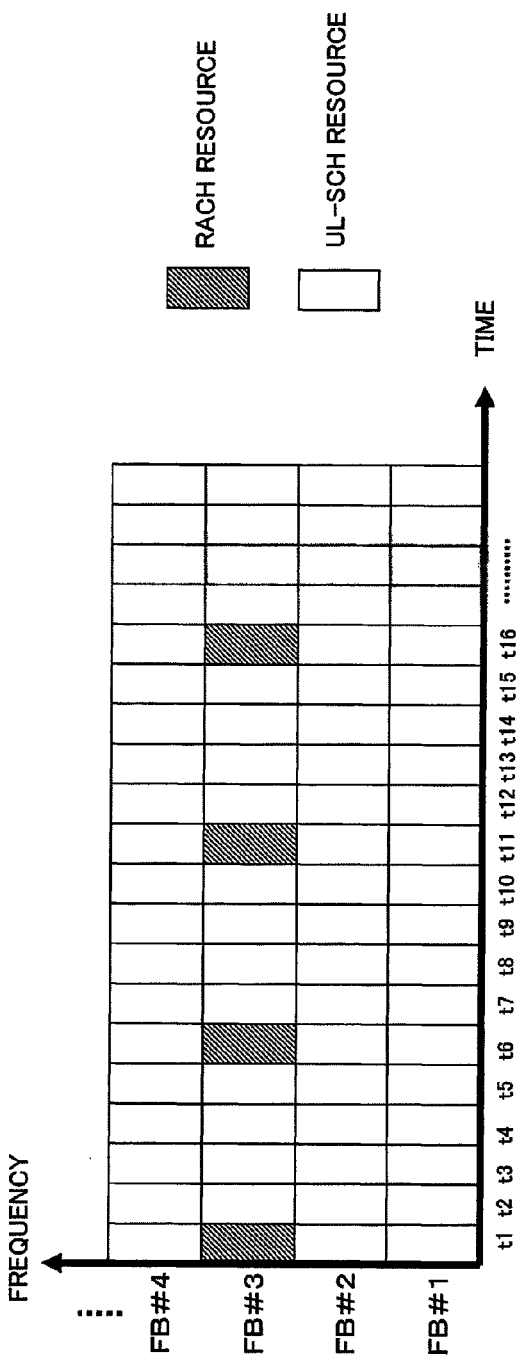
FIG. 1B is a resource structure diagram schematically showing radio resources based on both frequency-division and time-division techniques.

Moreover, it is assumed that the radio communication devices 10 to 12 control the allocation of uplink and downlink resources in the cells A to C respectively, and that each of the cells A to C has a basic resource structure as shown in FIG. 1B. The RACH transmission power control according to any one of the above-described exemplary embodiments is performed by each radio communication device. Incidentally, the plurality of radio communication devices connected through the network 13 may be included in a single base station eNB, or each of the radio communication devices may be a single base station eNB. Hereinafter, the configuration and operation of each of a radio communication device and a mobile station will be described.

2.1) Radio Communication Device

Figure 10:
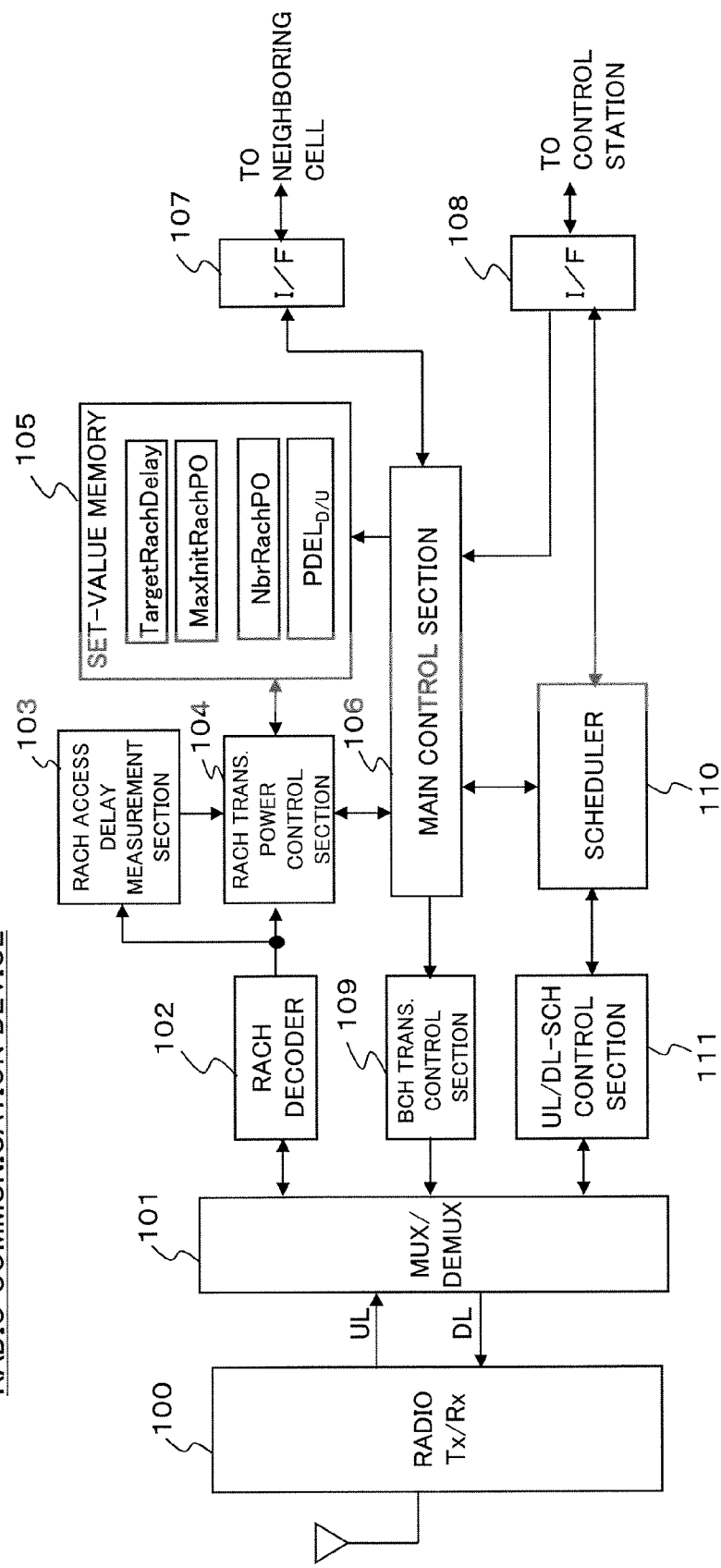
FIG. 10 is a block diagram showing a configuration of a radio communication device mounted with a RACH transmission power control device according to the present invention.

FIG. 10 is a block diagram showing a configuration of a radio communication device mounted with a RACH transmission power control device according to the present invention. To avoid complication, shown here is only the circuitry related to the RACH transmission power control according to the present invention.

The radio communication device has a radio transceiver 100 and a multiplexer/demultiplexer 101, as physical-layer devices performing radio communication with a plurality of mobile stations present in its own cell. The multiplexer/demultiplexer 101 demultiplexes a RACH channel from an uplink UL, and a RACH signal on the RACH channel is decoded by a RACH decoder 102. When the RACH signal has been received completely from each mobile station UE, a RACH delay measurement section 103 statistically processes the number of RACH receptions, whereby the average RACH access delay can be obtained as described already. However, in the case where the number of failed RACH transmissions is reported along with a scheduling request from a mobile station UE, it is also possible that the RACH delay measurement section 103 receives the numbers of failed RACH transmissions through a scheduler 110 and a UL/DL-SCH control section 111, which will be described later, and statistically processes the numbers of failed RACH transmissions, thereby obtaining the average RACH access delay.

A RACH transmission power control section 104 controls the initial RACH transmission power in its own cell in accordance with any one of the above-described exemplary embodiments. A set-value memory 105 stores various set values to be used in any one of the above-described exemplary embodiments. For example, in the case of the first exemplary embodiment, the set-value memory 105 stores the target RACH access delay (TargetRachDelay) and the maximum initial RACH transmission power offset (MaxInitRachP0). The RACH transmission power control section 104 compares the average RACH access delay (AvRachDelay) with the target RACH access delay (TargetRachDelay) and, in accordance with the result of this comparison, performs control for increasing/decreasing the initial RACH transmission power offset (InitRachP0) with an upper limit placed at the maximum initial RACH transmission power offset (MaxInitRachP0). In the case of the second exemplary embodiment, the set-value memory 105 stores the target RACH access delay (TargetRachDelay) and the neighboring RACH transmission power offset (NbrRachP0). The RACH transmission power control section 104 compares the average RACH access delay (AvRachDelay) with the target RACH access delay (TargetRachDelay) and compares the initial RACH transmission power offset (InitRachP0) with the neighboring RACH transmission power offset (NbrRachP0). In accordance with the results of these comparisons, the RACH transmission power control section 104 performs control for increasing/decreasing the initial RACH transmission power offset (InitRachP0). Note that the RACH transmission power control section 104, as well as a main control section 106, can also be implemented by executing programs on a program-controlled processor such as a CPU or a computer.

The main control section 106 controls the allover operation of the radio communication device. In relation to the present invention, the main control section 106 receives information on a neighboring cell, such as the RACH resources used in the neighboring cell and the neighboring RACH transmission power offset (NbrRachP0), from a radio communication device controlling the neighboring cell through an interface 107 and stores the information in the set-value memory 105. Further, the main control section 106 receives the target RACH access delay (TargetRachDelay) and the maximum initial RACH transmission power offset (MaxInitRachP0) from the controller through an interface 108 and stores these values in the set-value memory 105.

Moreover, the main control section 106 broadcasts the initial RACH transmission power offset set by the RACH transmission power control section 104, across its own cell by using a BCH transmission control section 109, whereby each mobile station becomes capable of RACH transmission.

When synchronization with a mobile station UE has been established through a RACH procedure, and allocation of resources for data transmission has been completed, then downlink data received from the controller through the interface 108 is transmitted to the mobile station UE in question through the scheduler 110 and the UL/DL-SCH control section 111, and uplink data from this mobile station UE is transmitted to the controller through the UL/DL-SCH control section 111 and the scheduler 110.

2.2) Mobile Station

Figure 11:
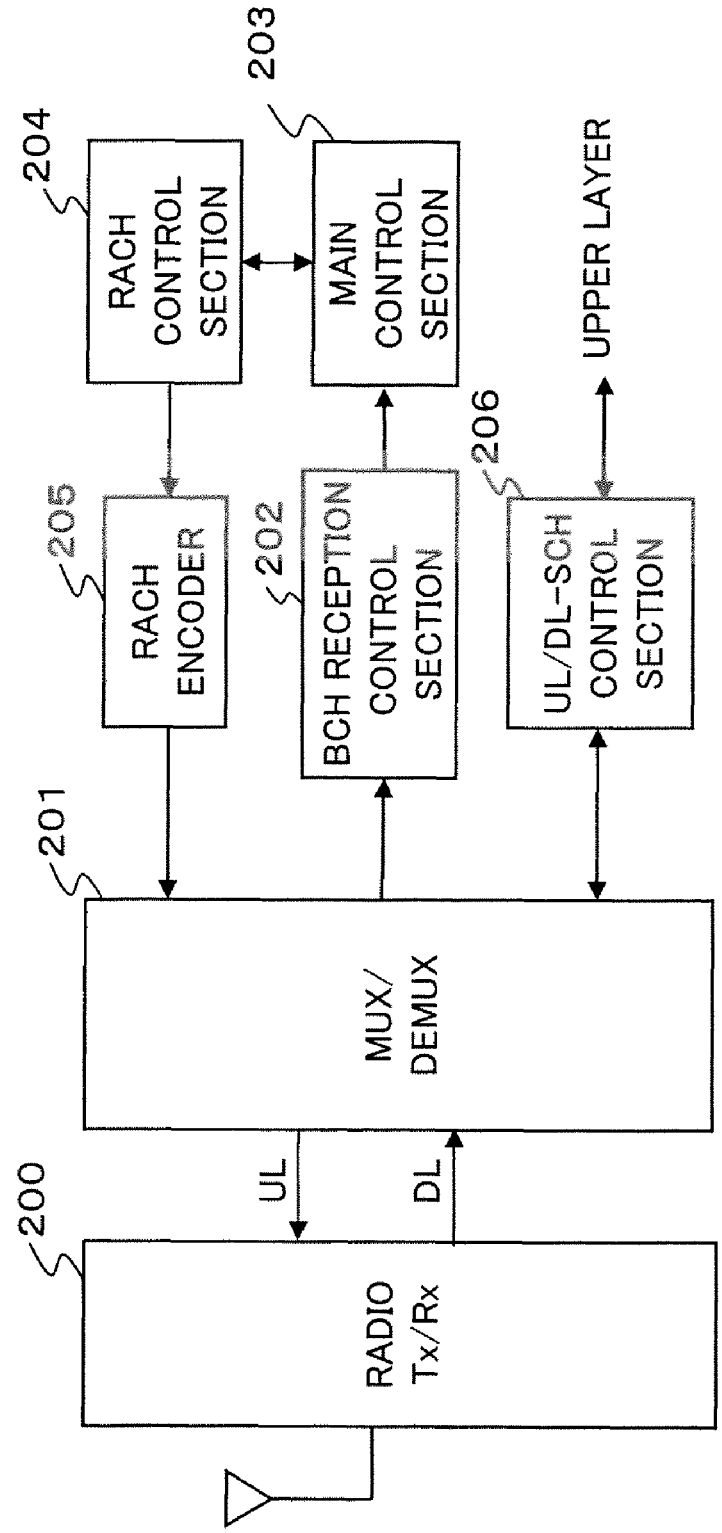
FIG. 11 is a block diagram showing a configuration of a mobile station UE shown in FIG. 9.

FIG. 11 is a block diagram showing a configuration of a mobile station UE shown in FIG. 9. The mobile station UE has a radio transceiver 200 and a multiplexer/demultiplexer 201, as physical-layer devices performing radio communication with a base station eNB or radio communication device. The radio transceiver 200 and multiplexer/demultiplexer 201 receive RACH resource information and initial RACH transmission power information broadcast from a radio communication device. This RACH-related information is output to a RACH control section 204 through a BCH reception control section 202 and a main control section 203. In accordance with the RACH resource information and the initial RACH transmission power information, the RACH control section 204 outputs a RACH signal to the multiplexer/demultiplexer 201 through a RACH encoder 205. The signal is multiplexed by the multiplexer/demultiplexer 201 and then transmitted over the RACH by using a predetermined RACH resource. The RACH control section 204 establishes uplink synchronization by receiving a response to this RACH transmission from the radio communication device.

An UL/DL-SCH control section 206 makes a scheduling request when, for example, uplink data is created, and transmits the request through the radio transceiver 200 and the multiplexer/demultiplexer 201. Upon receipt of a scheduling grant from the radio communication device as a response to the scheduling request, the UL/DL-SCH control section 206 outputs the data for transmission, which is input from an upper layer, to the multiplexer/demultiplexer 201, which then transmits the data through the radio transceiver 200 by using an allocated UL-SCH resource.

Incidentally, the RACH control section 204 counts the number of failed RACH transmissions made, or the time having passed (the power ramping period), before the RACH response to the RACH transmission is received, and notifies this count value to the radio communication device as information for calculating the average RACH access delay.

3. Operations of the Exemplary Embodiments

Next, specific examples of the RACH transmission power control operation carried out in the radio communication device shown in FIG. 10 will be described in detail with reference to flow charts. Note that the undermentioned control flow functions can also be implemented by executing programs on a program-controlled processor such as a CPU or computer.

3.1) Operation of the First Exemplary Embodiment

Figure 12:
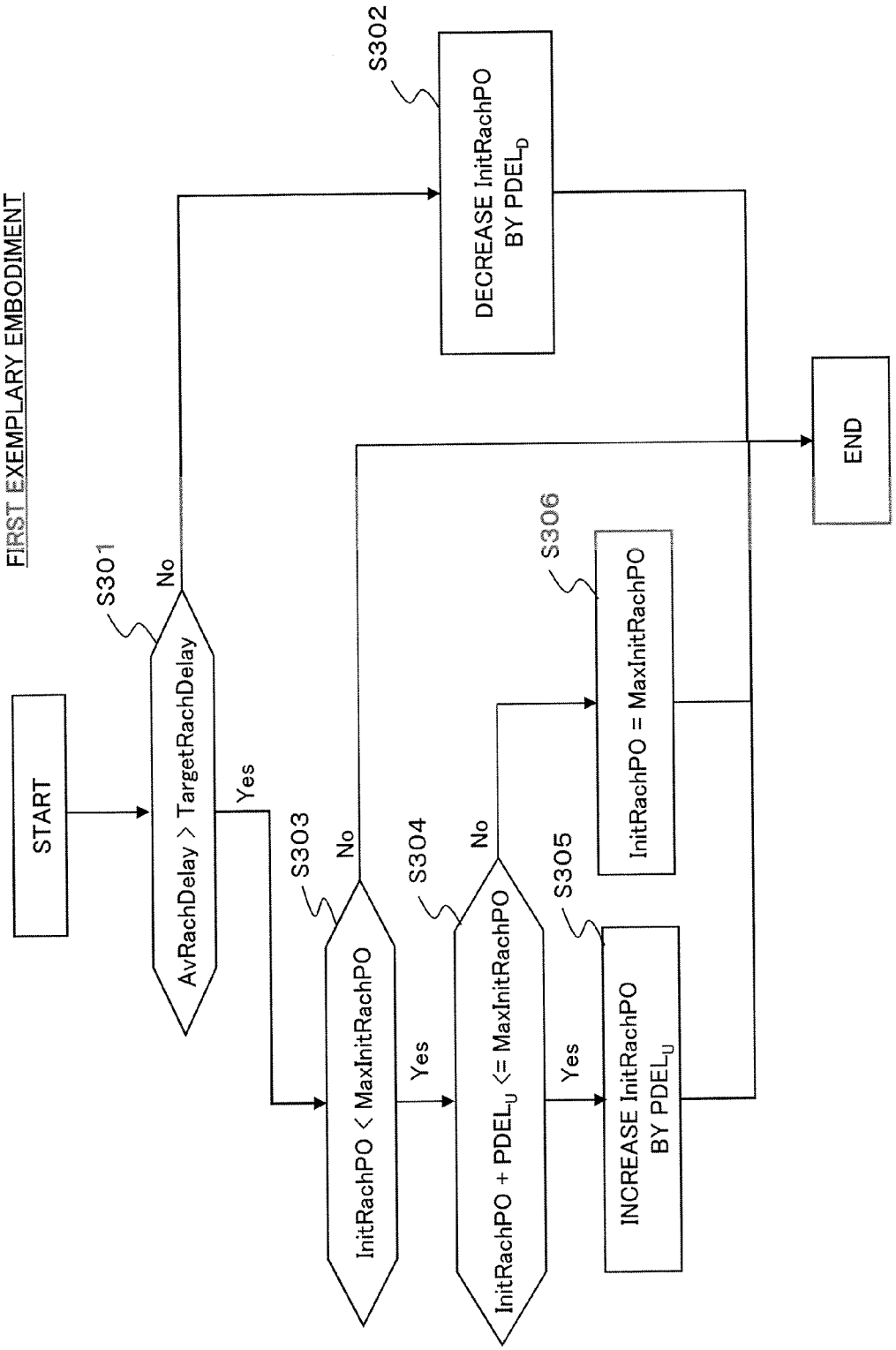
FIG. 12 is a flow chart showing the RACH transmission power control method according to the first exemplary embodiment of the present invention.

FIG. 12 is a flow chart showing the RACH transmission power control method according to the first exemplary embodiment of the present invention. The specific operation of the first exemplary embodiment shown in FIG. 5A and FIG. 5B will be described in more detail with reference to this flow chart. In this exemplary embodiment, it is assumed that the set-value memory 105 stores a target RACH access delay (TargetRachDelay), a maximum initial RACH transmission power offset (MaxInitRachP0), and a lower-limit initial RACH transmission power offset (LowerLimitInitRachP0).

The main control section 106 of the radio communication device controls the RACH access delay measurement section 103, thereby obtaining the average RACH access delay (AvRachDelay) at constant time intervals (see FIG. 5A). The RACH transmission power control section 104 compares the obtained average RACH access delay (AvRachDelay) with the target RACH access delay (TargetRachDelay) (Step S301). When the average RACH access delay (AvRachDelay) is equal to or smaller than the target RACH access delay (TargetRachDelay), that is, AvRachDelay≤TargetRachDelay (Step S301: No), then the RACH transmission power control section 104 decreases the initial RACH transmission power offset (InitRachP0) of its own cell by a predetermined step $PDEL_D$ from the current level (Step S302). Here, the lower-limit initial RACH transmission power offset (LowerLimitInitRachP0) may be set as a lower limit. Note that if the radio communication device places higher priority on connection than on interference prevention, it may be determined in Step S301 whether or not AvRachDelay≥TargetRachDelay.

When the average RACH access delay (AvRachDelay) is larger than the target RACH access delay (TargetRachDelay), that is, AvRachDelay>TargetRachDelay (Step S301: Yes), then the RACH transmission power control section 104 subsequently determines whether or not the current initial RACH transmission power offset (InitRachP0) is smaller than the maximum initial RACH transmission power offset (MaxInitRachP0) (Step S303). If the current initial RACH transmission power offset (InitRachP0) has been already set at the maximum initial RACH transmission power offset (MaxInitRachP0) (Step S303: No), the processing is terminated. When the current initial RACH transmission power offset (InitRachP0) is smaller than the maximum initial RACH transmission power offset (MaxInitRachP0) (Step S303: Yes), the RACH transmission power control section 104 further determines whether or not the initial RACH transmission power offset (InitRachP0) will exceed the maximum initial RACH transmission power offset (MaxInitRachP0) if the current initial RACH transmission power offset (InitRachP0) is increased by a predetermined increment step $PDEL_U$ (Step S304). This operation in Step S304 is an example of a method for determining whether or not the current initial RACH transmission power offset (InitRachP0) has been raised to a level close to the maximum initial RACH transmission power offset (MaxInitRachP0).

If InitRachP0+$PDEL_U$≤MaxInitRachP0 (Step S304: Yes), the RACH transmission power control section 104 increases the current initial RACH transmission power offset (InitRachP0) by the predetermined step $PDEL_U$ (Step S305). Upon this operation, the main control section 106 controls the BCH transmission control section 109, thereby broadcasting the new initial RACH transmission power offset (InitRachP0) of its own cell.

If InitRachP0+$PDEL_U$>MaxInitRachP0 (Step S304: No), the RACH transmission power control section 104 sets the current initial RACH transmission power offset (InitRachP0) at the maximum initial RACH transmission power offset (MaxInitRachP0) (Step S306). Upon this operation, the main control section 106 controls the BCH transmission control section 109, thereby broadcasting the new initial RACH transmission power offset (InitRachP0) of its own cell.

According to the first exemplary embodiment as described above, the initial RACH transmission power offset (InitRachP0) of each cell can be controlled as illustrated in FIG. 5B, and in the entire network, automatic control of the RACH transmission power can be achieved.

3.2) Operation of the Second Exemplary Embodiment

Figure 13:
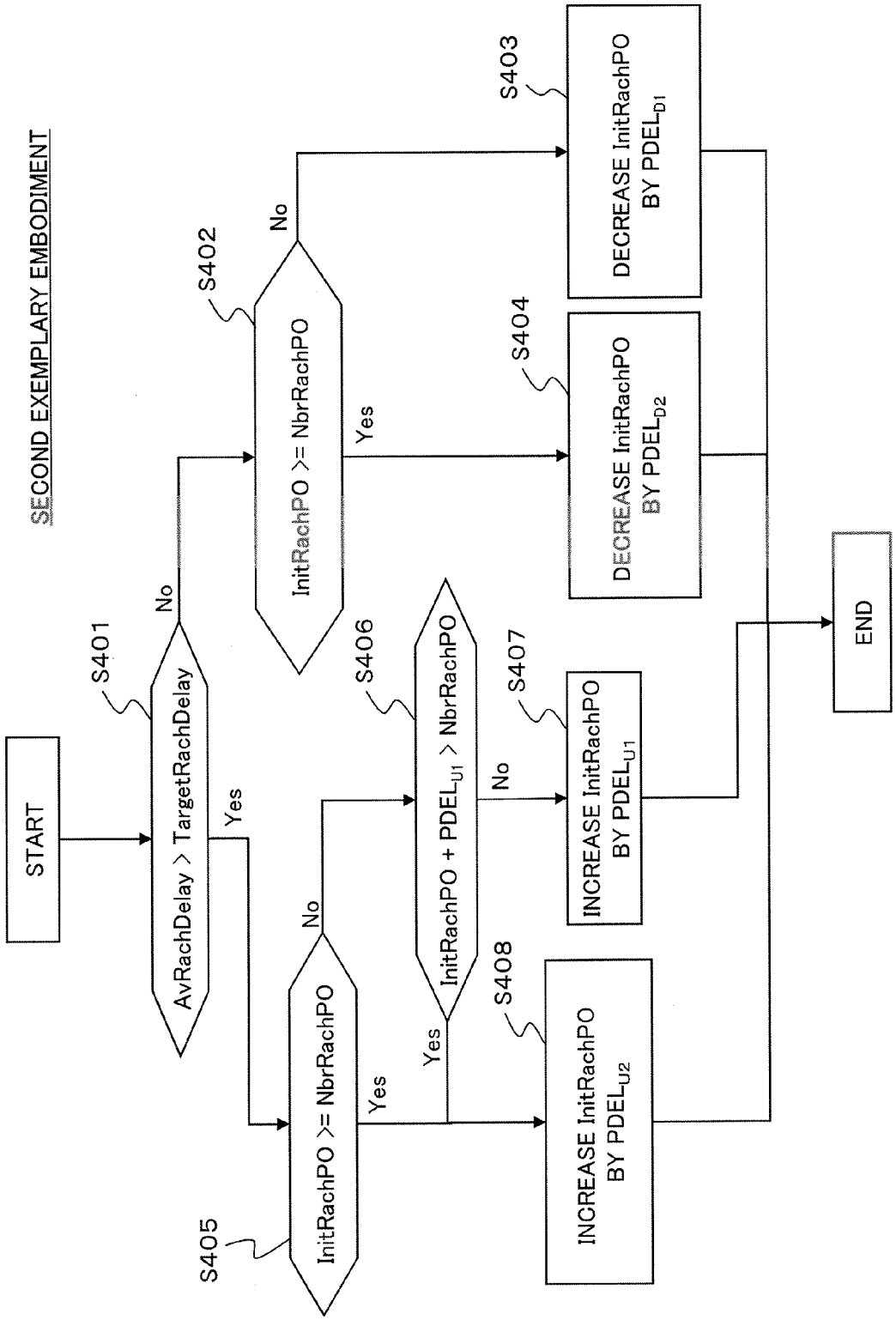
FIG. 13 is a flow chart showing the RACH transmission power control method according to the second exemplary embodiment of the present invention.

FIG. 13 is a flow char showing the RACH transmission power control method according to the second exemplary embodiment of the present invention. The specific operation of the second exemplary embodiment shown in FIG. 6A and FIG. 6B will be described in more detail with reference to this flow chart. In this exemplary embodiment, it is assumed that the set-value memory 105 stores a target RACH access delay (TargetRachDelay), a neighboring RACH transmission power offset (NbrRachP0), an upper-limit initial RACH transmission power offset (UpperLimitMaxInitRachP0), and a lower-limit initial RACH transmission power offset (LowerLimitInitRachP0). Note that when a plurality of neighboring RACH transmission power offsets (NbrRachP0) are notified from a plurality of neighboring cells respectively, as described earlier, it is sufficient to select the largest or smallest one of the neighboring RACH transmission power offsets, depending on which one of interference prevention and connection higher priority is placed on. Alternatively, it is also possible to use the average value of the neighboring RACH transmission power offsets.

The main control section 106 of the radio communication device controls the RACH access delay measurement section 103, thereby measuring the average RACH access delay (AvRachDelay) at constant time intervals (see FIG. 6A). The RACH transmission power control section 104 compares the measured average RACH access delay (AvRachDelay) with the target RACH access delay (TargetRachDelay) (Step S401). When the average RACH access delay (AvRachDelay) is equal to or smaller than the target RACH access delay (TargetRachDelay), that is, AvRachDelay≤TargetRachDelay (Step S401: No), then the RACH transmission power control section 104 subsequently determines whether or not the current initial RACH transmission power offset (InitRachP0) is equal to or larger than the neighboring RACH transmission power offset (NbrRachP0) (Step S402).

When the initial RACH transmission power offset (InitRachP0) of its own cell is smaller than the neighboring RACH transmission power offset (NbrRachP0) (Step S402: No), the RACH transmission power control section 104 decreases the current initial RACH transmission power offset (InitRachP0) by a predetermined step $PDEL_{D1}$ (Step S403). When the current initial RACH transmission power offset (InitRachP0) of its own cell is equal to or larger than the neighboring RACH transmission power offset (NbrRachP0) (Step S402: Yes), the RACH transmission power control section 104 decreases the current initial RACH transmission power offset (InitRachP0) by a predetermined step $PDEL_{D2}$ (Step S404), In Step S403 and Step S404, it is also possible to set the lower-limit initial RACH transmission power offset (LowerLimitInitRachP0) as a lower limit.

By setting so that $PDEL_{D2}>PDEL_{D1}$, the higher the initial RACH transmission power offset (InitRachP0) of its own cell is, the larger the size for decrease can be made. Hence, the level of interference can be reduced promptly.

When the average RACH access delay (AvRachDelay) is larger than the target RACH access delay (TargetRachDelay), that is, AvRachDelay>TargetRachDelay (Step S401: Yes), then the RACH transmission power control section 104 subsequently determines whether or not the current initial RACH transmission power offset (InitRachP0) is equal to or larger than the neighboring RACH transmission power offset (NbrRachP0) (Step S405).

When the current initial BACH transmission power offset (InitRachP0) of its own cell is smaller than the neighboring RACH transmission power offset (NbrRachP0) (Step S405: No), the RACH transmission power control section 104 further determines whether or not the initial RACH transmission power offset (InitRachP0) will exceed the neighboring RACH transmission power offset (NbrRachP0) if the current initial RACH transmission power offset (InitRachP0) is increased by a predetermined step $PDEL_{U1}$ (Step S406). This operation in Step S406 is an example of the method for determining whether or not the current initial RACH transmission power offset (InitRachP0) has been raised to a level close to the neighboring RACH transmission power offset (NbrRachP0).

If InitRachP0+$PDEL_{U1}$≦NbrRachP0 (Step S406: No), the RACH transmission power control section 104 increases the current initial RACH transmission power offset (InitRachP0) by the predetermined step $PDEL_{U1}$ (Step S407). Upon this operation, the main control section 106 controls the BCH transmission control section 109, thereby broadcasting the new initial RACH transmission power offset (InitRachP0) of its own cell.

When the initial RACH transmission power offset (InitRachP0) of its own cell is equal to or larger than the neighboring RACH transmission power offset (NbrRachP0) (Step S405: Yes), or If InitRachP0+$PDEL_{U1}$>NbrRachP0 (Step S406: Yes), then the RACH transmission power control section 104 increases the current initial RACH transmission power offset (InitRachP0) by a predetermined step $PDEL_{U2}$ (Step S408). In Step S408, it is also possible to set the upper-limit initial RACH transmission power offset (UpperLimitMaxInitRachP0) as an upper limit.

By setting so that $PDEL_{U1}>PDEL_{U2}$, the larger the initial RACH transmission power offset (InitRachP0) of its own cell is, the smaller the size for increase can be made. Hence, it is possible to avoid a sudden rise in the level of interference with the neighboring cell.

When the initial RACH transmission power offset has been set in this manner, the main control section 106 controls the BCH transmission control section 109, thereby broadcasting the new initial RACH transmission power offset (InitRachP0) of its own cell.

According to the second exemplary embodiment as described above, the initial RACH transmission power offset (InitRachP0) of each cell can be controlled as illustrated in FIG. 6B, and in the entire network, automatic control of the RACH transmission power can be achieved.

3.3) Operation of the Third Exemplary Embodiment

Figure 14:
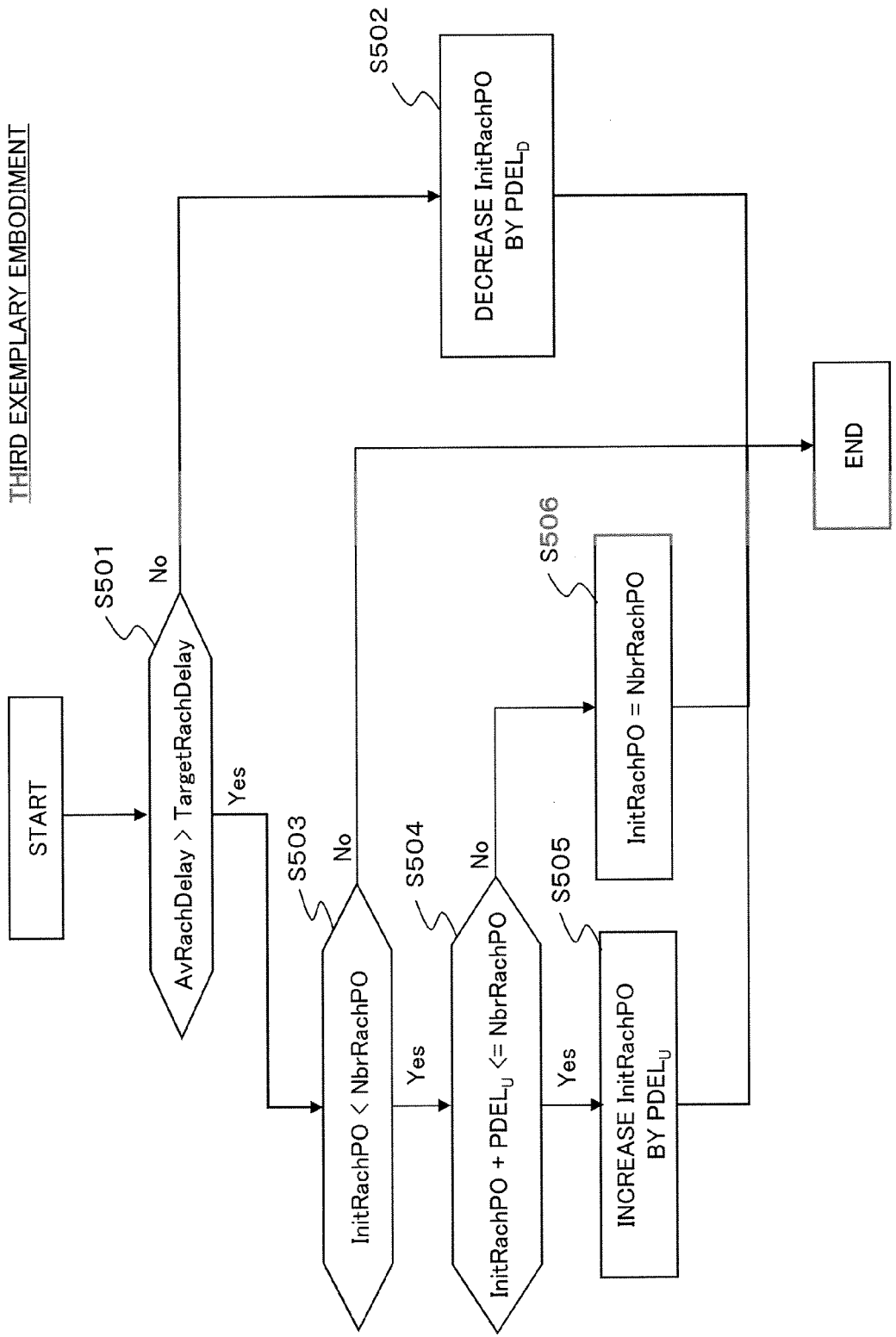
FIG. 14 is a flow chart showing the RACH transmission power control method according to the third exemplary embodiment of the present invention.

FIG. 14 is a flow chart showing the RACH transmission power control method according to the third exemplary embodiment of the present invention. The specific operation of the third exemplary embodiment shown in FIG. 7A and FIG. 7B will be described in more detail with reference to this flow chart. In this exemplary embodiment, it is assumed that the set-value memory 105 stores a target RACH access delay (TargetRachDelay), a neighboring RACH transmission power offset (NbrRachP0), and a lower-limit initial RACH transmission power offset (LowerLimitInitRachP0). Note that when a plurality of neighboring RACH transmission power offsets (NbrRachP0) are notified from a plurality of neighboring cells respectively, it is sufficient, as mentioned already, to select the largest or smallest one of the neighboring RACH transmission power offsets, depending on which one of interference prevention and connection higher priority is placed on.

The main control section 106 of the radio communication device controls the RACH access delay measurement section 103, thereby measuring the average RACH access delay (AvRachDelay) at constant time intervals (see FIG. 7A). The RACH transmission power control section 104 compares the measured average RACH access delay (AvRachDelay) with the target RACH access delay (TargetRachDelay) (Step S501). When the average RACH access delay (AvRachDelay) is equal to or smaller than the target RACH access delay (TargetRachDelay), that is, AvRachDelay≦TargetRachDelay (Step S501: No), the RACH transmission power control section 104 decreases the current initial RACH transmission power offset (InitRachP0) of its own cell by a predetermined step $PDEL_D$ (Step S502). Here, the lower-limit initial RACH transmission power offset (LowerLimitInitRachP0) may be set as a lower limit. Note that if the radio communication device places higher priority on connection than on interference prevention, it may be determined in Step S501 whether or not AvRachDelay≧TargetRachDelay.

When the average RACH access delay (AvRachDelay) is larger than the target RACH access delay (TargetRachDelay), that is, AvRachDelay>TargetRachDelay (Step S501: Yes), the RACH transmission power control section 104 subsequently determines whether or not the current initial RACH transmission power offset (InitRachP0) is smaller than the neighboring RACH transmission power offset (NbrRachP0) (Step S503). If the current initial RACH transmission power offset (InitRachP0) has been already set at the neighboring RACH transmission power offset (NbrRachP0) (Step S503: No), the processing is terminated. When the current initial RACH transmission power offset (InitRachP0) is smaller than the neighboring RACH transmission power offset (NbrRachP0) (Step S503: Yes), the RACH transmission power control section 104 further determines whether or not the initial RACH transmission power offset (InitRachP0) will exceed the neighboring RACH transmission power offset (NbrRachP0) if the current initial RACH transmission power offset (InitRachP0) is increased by a predetermined step $PDEL_U$ (Step S504). This operation in Step S504 is an example of the method for determining whether or not the current initial RACH transmission power offset (InitRachP0) has been raised to a level close to the neighboring RACH transmission power offset (NbrRachP0).

If InitRachP0+PDEL$_U$≤NbrRachP0 (Step S504: Yes), the RACH transmission power control section 104 increases the current initial RACH transmission power offset (InitRachP0) by the predetermined step PDEL$_U$ (Step S505). Upon this operation, the main control section 106 controls the BCH transmission control section 109, thereby broadcasting the new initial RACH transmission power offset (InitRachP0) of its own cell.

When InitRachP0+PDEL$_U$>NbrRachP0 (Step S504: No), the RACH transmission power control section 104 sets the current initial RACH transmission power offset (InitRachP0) at the neighboring RACH transmission power offset (NbrRachP0) (Step S506). Upon this operation, the main control section 106 controls the BCH transmission control section 109, thereby broadcasting the new initial RACH transmission power offset (InitRachP0) of its own cell.

According to the third exemplary embodiment as described above, the initial RACH transmission power offset (InitRachP0) of each cell can be controlled as illustrated in FIG. 7B, and in the entire network, automatic control of the RACH transmission power can be achieved.

Incidentally, in the above-described second and third exemplary embodiments, determination is made based on whether the value of the average RACH access delay is large or small, relatively to the neighboring RACH transmission power offset. However, it is also possible to make determination based on whether the value of the average RACH access delay is large or small, relatively to a constant multiple of the neighboring transmission power offset or a value obtained by adding or subtracting a certain value to/from the neighboring RACH transmission power offset.

4. Application Examples

Any one of the above-described exemplary embodiments of the present invention can be applied to mobile communications systems based on LTE.

Figure 15:
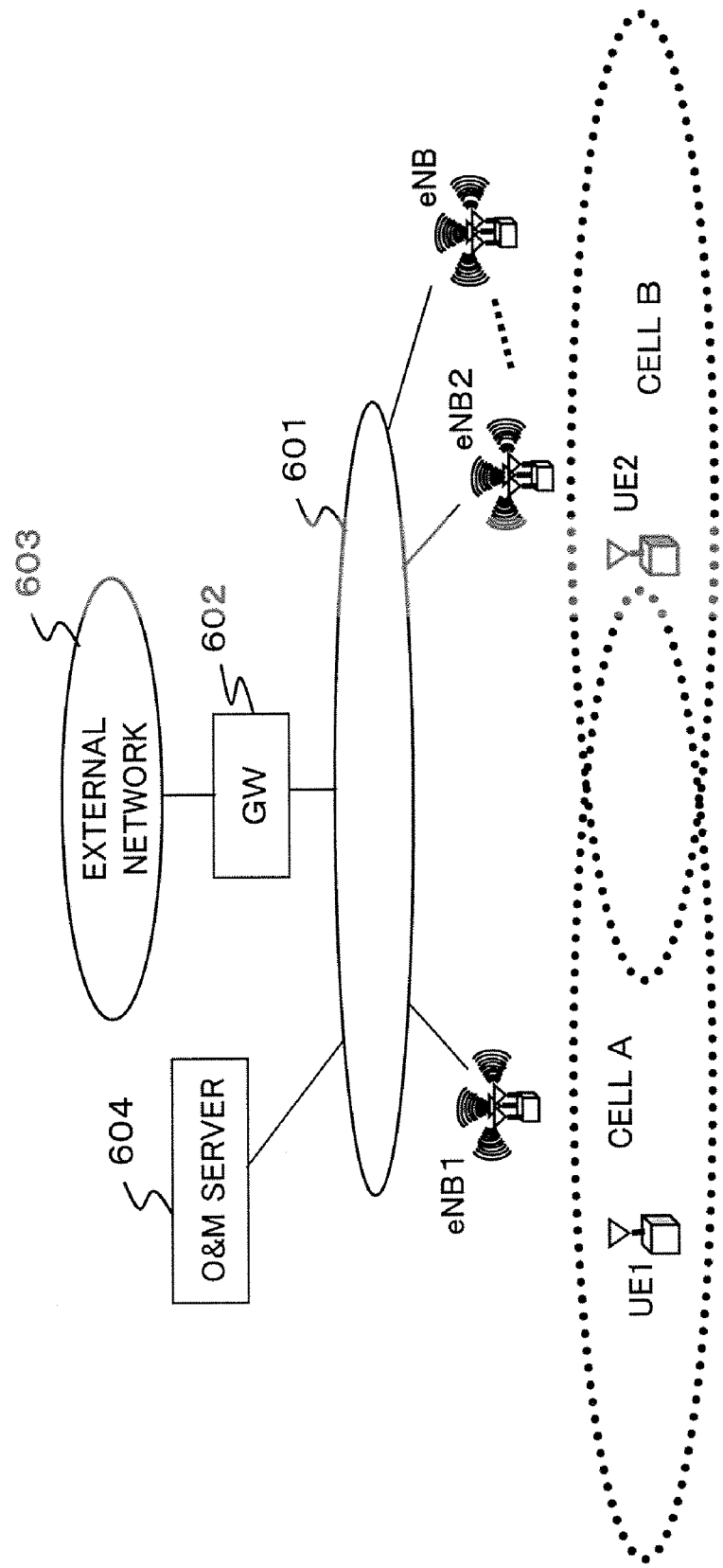
FIG. 15 is a schematic network diagram of a mobile communications system to which the present invention is applied.

FIG. 15 is a schematic network diagram of a mobile communications system to which the present invention is applied. Here, a plurality of base stations eNB are connected to a network 601, and each of the base stations eNB can connect to an external network 603, typified by the Internet, through a gate way 602 serving as a central station or control station. Various setup parameters are set on each of the base stations eNB from an O&M server 604, and the above-described RACH transmission power control according to any one of the exemplary embodiments is carried out. Thus, automatic control of the RACH transmission power in the entire network can be achieved, and a process of tuning the network can be automatically performed.

The present invention can be applied to radio communications systems in which inter-cell interference may occur and, more particularly, to mobile communications systems using an access scheme (FTDMA) based on a frequency-divided and time-divided resource structure.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A control method of uplink access transmission power in each of a plurality of radio communication devices each controlling cells in a radio communications system, comprising:
    a) detecting an uplink access delay in a cell of the radio communication device;
    b) comparing an amount of access delay obtained from the uplink access delay with a target delay; and
    c) controlling a value related to uplink access transmission power based on a comparison result of the b).

2. The control method according to claim 1, wherein the value related to uplink access transmission power is controlled such that the amount of access delay follows the target delay.

3. The control method according to claim 1, wherein the target delay is set for each of the radio communication devices.

4. The control method according to claim 1, wherein the c) comprises:
    c.1) when the amount of access delay is smaller than the target delay, decreasing the value related to uplink access transmission power; and
    c.2) when the amount of access delay is greater than the target delay, increasing the value related to uplink access transmission power within a predetermined upper limit.

5. The control method according to claim 4, wherein the predetermined upper limit is set for each of the radio communication devices.

6. The control method according to claim 1, wherein the c) comprises:
    c.1) receiving an uplink access transmission power of a neighboring cell from the neighboring cell;
    c.2) when the amount of access delay is smaller than the target delay, decreasing the value related to uplink access transmission power;
    c.3) when the amount of access delay is greater than the target delay, comparing a current value related to the uplink access transmission power with a value related to the uplink access transmission power of the neighboring cell; and
    c.4) changing an increment step of the value related to uplink access transmission power based on a comparison result of the value related to the uplink access transmission power.

7. The control method according to claim 6, wherein the c.4) comprises:
    increasing the value related to the uplink access transmission power by a first increment step when the current value related to the uplink access transmission power is smaller than the value related to the uplink access transmission power of the neighboring cell; and
    increasing the value related to the uplink access transmission power by a second increment step when the current value related to the uplink access transmission power is larger than the value related to the uplink access transmission power of the neighboring cell, wherein the second increment step is smaller in size than the first increment step.

8. The control method according to claim 1, wherein the c) comprises:
    c.1) when the amount of access delay is smaller than the target delay, comparing a current value related to the uplink access transmission power with a value related to the uplink access transmission power of a neighboring cell; and c.2) changing a decrement step of the value related to uplink access transmission power based on a comparison result of the value related to the uplink access transmission power.

9. The control method according to claim 8, wherein the c.2) comprises:

decreasing the value related to the uplink access transmission power by a first decrement step when the current value related to the uplink access transmission power is smaller than the value related to the uplink access transmission power of the neighboring cell; and decreasing the value related to the uplink access transmission power by a second decrement step when the current value related to the uplink access transmission power is larger than the value related to the uplink access transmission power of the neighboring cell, wherein the second decrement step is larger in size than the first decrement step.

10. The control method according to claim 1, wherein the c) comprises:

c.1) receiving a value related to an uplink access transmission power of a neighboring cell from the neighboring cell;

c.2) when the amount of access delay is smaller than the target delay, decreasing the value related to uplink access transmission power;

c.3) when the amount of access delay is greater than the target delay, increasing the value related to uplink access transmission power so as not to exceed the value related to an uplink access transmission power of the neighboring cell.

11. The control method according to claim 1, wherein the amount of access delay is obtained based on number of reception times the radio communication device has received uplink access control signals from its own cell.

12. The control method according to claim 1, wherein the amount of access delay is obtained based on number of uplink access transmissions made before a mobile station located in a cell of the radio communication device successfully performs uplink access transmission.

13. The control method according to claim 1, wherein the amount of access delay is obtained based on time that elapsed before successful uplink access transmission made by a mobile station located in a cell of the radio communication device.

14. The control method according to claim 1, wherein the value related to the uplink access transmission power is one of uplink access transmission power, uplink access transmission power offset and increment/decrement step size.

15. A control device of uplink access transmission power in each of a plurality of radio communication devices each controlling cells in a radio communications system, comprising:

a detector for detecting an uplink access delay in a cell of the radio communication device;

a comparator for comparing an amount of access delay obtained from the uplink access delay with a target delay; and a controller for controlling a value related to uplink access transmission power based on a comparison result of the comparator.

16. The control device according to claim 15, wherein the controller controls the value related to uplink access transmission power such that the amount of access delay follows the target delay.

17. The control device according to claim 15, wherein the target delay is set for each of the radio communication devices.

18. The control device according to claim 15, wherein the controller decreases the value related to uplink access transmission power when the amount of access delay is smaller than the target delay, and increases the value related to uplink access transmission power within a predetermined upper limit when the amount of access delay is greater than the target delay.

19. The control device according to claim 18, wherein the predetermined upper limit is set for each of the radio communication devices.

20. The control device according to claim 15, further comprising:

a receiver for receiving an uplink access transmission power of a neighboring cell from the neighboring cell; and an uplink access transmission power comparator for comparing a current value related to the uplink access transmission power with a value related to the uplink access transmission power of the neighboring cell, wherein the controller decreases the value related to uplink access transmission power when the amount of access delay is smaller than the target delay; and changes an increment step of the value related to uplink access transmission power based on a comparison result of the value related to the uplink access transmission power when the amount of access delay is greater than the target delay.

21. The control device according to claim 20, wherein the controller increases the value related to the uplink access transmission power by a first increment step when the current value related to the uplink access transmission power is smaller than the value related to the uplink access transmission power of the neighboring cell; and increases the value related to the uplink access transmission power by a second increment step when the current value related to the uplink access transmission power is larger than the value related to the uplink access transmission power of the neighboring cell, wherein the second increment step is smaller in size than the first increment step.

22. The control device according to claim 15, further comprising:

a receiver for receiving an uplink access transmission power of a neighboring cell from the neighboring cell; and an uplink access transmission power comparator for comparing a current value related to the uplink access transmission power with a value related to the uplink access transmission power of the neighboring cell, wherein the controller changes a decrement step of the value related to uplink access transmission power based on a comparison result of the value related to the uplink access transmission power when the amount of access delay is smaller than the target delay.

23. The control device according to claim 22, wherein the controller decreases the value related to the uplink access transmission power by a first decrement step when the current value related to the uplink access transmission power is smaller than the value related to the uplink access transmission power of the neighboring cell; and decreases the value related to the uplink access transmission power by a second decrement step when the current value related to the uplink access transmission power is larger than the value related to the uplink access transmission power of the neighboring cell, wherein the second decrement step is larger in size than the first decrement step.

24. The control device according to claim 15, further comprising:
  a receiver for receiving a value related to an uplink access transmission power of a neighboring cell from the neighboring cell,
  wherein the controller decreases the value related to uplink access transmission power when the amount of access delay is smaller than the target delay; and increases the value related to uplink access transmission power so as not to exceed the value related to an uplink access transmission power of the neighboring cell when the amount of access delay is greater than the target delay.

25. The control device according to claim 15, further comprising a measurement section for measuring the amount of access delay based on number of reception times the radio communication device has received uplink access control signals from its own cell.

26. The control device according to claim 15, further comprising a measurement section for measuring the amount of access delay based on number of uplink access transmissions made before a mobile station located in a cell of the radio communication device successfully performs uplink access transmission.

27. The control device according to claim 15, further comprising a measurement section for measuring the amount of access delay based on time that elapsed before successful uplink access transmission made by a mobile station located in a cell of the radio communication device.

28. The control device according to claim 15, wherein the value related to the uplink access transmission power is one of uplink access transmission power, uplink access transmission power offset and increment/decrement step size.

29. A radio communication device which controls a cell of its own in a radio communications system including a plurality of cells, comprising:
  a detector for detecting an uplink access delay in the cell;
  a comparator for comparing an amount of access delay obtained from the uplink access delay with a target delay; and
  a controller for controlling a value related to uplink access transmission power based on a comparison result of the comparator.

30. A radio communications system including a plurality of cells, comprising a plurality of radio communication devices which control the plurality of cells, respectively,
  wherein each of the radio communication devices comprises:
  a detector for detecting an uplink access delay in the cell;
  a comparator for comparing an amount of access delay obtained from the uplink access delay with a target delay; and
  a controller for controlling a value related to uplink access transmission power based on a comparison result of the comparator.

31. A computer program for instructing a computer to control uplink access transmission power in a radio communication device controlling a cell in a radio communications system, comprising:
  detecting an uplink access delay in the cell;
  comparing an amount of access delay obtained from the uplink access delay with a target delay; and
  controlling a value related to uplink access transmission power based on a comparison result of the comparing.

* * * * *